US006552990B1

(12) United States Patent
Kajiyama et al.

(10) Patent No.: US 6,552,990 B1
(45) Date of Patent: Apr. 22, 2003

(54) OPTICAL HEAD FOR TWO DIFFERENT DISK THICKNESSES WITH A LIGHT BEAM DIAMETER CONTROL DEVICE

(75) Inventors: Seiji Kajiyama, Ibi-gun (JP); Yoichi Tsuchiya, Hashima (JP); Masato Yamada, Inuyama (JP); Yasuyuki Kanou, Hashima (JP); Shuichi Ichiura, Hashima (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/180,301

(22) PCT Filed: Sep. 29, 1997

(86) PCT No.: PCT/JP97/03482

§ 371 (c)(1),
(2), (4) Date: Nov. 5, 1998

(87) PCT Pub. No.: WO98/19303

PCT Pub. Date: May 7, 1998

(30) Foreign Application Priority Data

Oct. 31, 1996 (JP) .............................................. 8-290721

(51) Int. Cl.[7] ................................................ G11B 7/00
(52) U.S. Cl. ............................. 369/112.06; 369/44.14; 369/94; 369/44.37
(58) Field of Search ......................... 369/44.23, 44.37, 369/112, 118, 103, 109, 94, 44.14, 53.2, 112.06, 112.01, 44.15, 44.24, 44.16, 112.08, 112.24

(56) References Cited

U.S. PATENT DOCUMENTS 5,343,332 A    8/1994   Oono et al. .................. 359/837
5,638,353 A  * 6/1997   Takahashi .................... 369/112

(List continued on next page.)

FOREIGN PATENT DOCUMENTS

EP    0 610 055 A2    8/1994
EP    0 747 893 A2   12/1996

(List continued on next page.)

OTHER PUBLICATIONS

Supplementary European Search Report dated Apr. 17, 2001.
Office Action of corresponding Japanese Patent Application with English translation.

*Primary Examiner*—William Korzuch
*Assistant Examiner*—Kim-Kwok Chu
(74) *Attorney, Agent, or Firm*—Armstrong, Westerman & Hattori, LLP

(57) ABSTRACT

An optical pickup device which includes a semiconductor laser selectively generating a laser beam with a wavelength of 635 nm, a laser beam with a wavelength of 780 nm, and an optical device having a central region in which a hologram is formed and a peripheral region in which a diffraction grating is formed. In particular, the optical device is arranged immediately below an objective lens, and the central region allows transmission of the laser beam with the wavelength of 635 nm without any diffraction but increases the diameter of the teaser beam to the wavelength of 780 nm by diffraction. On the other hand, peripheral region allows transmission of the laser beam with the wavelength of 635 nm without any diffraction, but substantially shields the laser beam with the wavelength of 780 nm by diffraction. Thus, each laser beam with the wavelength 635 nm is transmitted through objective lens and focused on a signal recording surface of a DVD. The periphery of the laser beam with the wavelength of 780 nm is significantly diffracted by peripheral region of optical device and only the central portion of the laser beam enters objective lens while increasing its diameter. Thus, the laser beam with the wavelength of 780 nm is focused on a signal recording surface of a CD-R or a CD-ROM. Therefore, the optical pickup device is capable of compatibly reproducing the DVD, CD-R and CD-ROM.

1 Claim, 36 Drawing Sheets

U.S. PATENT DOCUMENTS

| | | | |
|---|---|---|---|
| 5,665,957 A | * 9/1997 | Lee et al. | 369/118 |
| 5,696,750 A | * 12/1997 | Katayama | 369/112 |
| 5,703,856 A | 12/1997 | Hayashi et al. | 369/53.2 |
| 5,708,641 A | * 1/1998 | Choi et al. | 369/112 |
| 5,734,637 A | * 3/1998 | Ootaki et al. | 369/112 |
| 5,748,603 A | * 5/1998 | Kim et al. | 369/112 |
| 5,777,973 A | * 7/1998 | Yoo et al. | 369/109 |
| 5,923,636 A | * 7/1999 | Haruguchi et al. | 369/112 |
| 5,930,214 A | * 7/1999 | Kasahara et al. | 369/112.24 |
| 5,930,219 A | * 7/1999 | Kim | 369/109 |
| 5,940,227 A | * 8/1999 | Haruguchi et al. | 369/44.15 |
| 5,940,360 A | * 8/1999 | Choi | 369/112 |
| 6,049,518 A | * 4/2000 | Tsuchiya et al. | 369/118 |

FOREIGN PATENT DOCUMENTS

| | | |
|---|---|---|
| JP | 63184935 A | 7/1988 |
| JP | 02079483 A | 3/1990 |
| JP | 5-303766 | 11/1993 |
| JP | 7-98431 | 4/1995 |
| JP | 8-55363 | 2/1996 |
| JP | 8-321065 | 12/1996 |
| JP | 9-54973 | 2/1997 |
| JP | 09306018 A | 11/1997 |

* cited by examiner

SEMICONDUCTOR LASER DRIVING CIRCUIT — 18

INCIDENT LIGHT λ

34

34

35

OPTICAL HEAD FOR TWO DIFFERENT DISK THICKNESSES WITH A LIGHT BEAM DIAMETER CONTROL DEVICE

TECHNICAL FIELD

The present invention relates to optical pickup devices and, more specifically, to an optical pickup device performing recording and/or reproducing for a digital video disk (a DVD) and a compact disk (a CD).

TECHNICAL BACKGROUND

An optical disk with a thickness of about 1.2 mm, such as a CD-ROM (Compact Disk-Read Only Memory), has been provided for reading information using a semiconductor laser. In this type of optical disk, by performing focusing servo control and tracking servo control for an objective lens for pickup, a pit string of a signal recording surface is irradiated with laser beam to reproduce a signal. Recently, such optical disks are increasingly becoming higher in density for recording an animation lasting for a long period of time.

For example, a DVD standard has been proposed for recording information of 4.7 G bytes on one side of the optical disk having a diameter of 12 cm, which is the same as that of the CD-ROM. A transparent substrate of the DVD has a thickness of about 0.6 mm. A single DVD, which has two such transparent substrates applied to each other back to back, can record information of 9.4 G bytes. Further, as a write-once optical disk having the same diameter, thickness of substrate and recording density as those for the CD-ROM, there exists a CD-R (Compact Disk-Recordable).

Since three different types of optical disks, including the DVD, the CD-ROM and the CD-R, would exist in the same apparatus in the near future, a device capable of compatibly reproducing these three different types of optical disks is required. The DVD and the CD-ROM or the CD-R, however, cannot be reproduced by a single optical pickup device because of the difference in thicknesses of the transparent substrates.

Then, in Japanese Patent Laying-Open No. 5-303766, an apparatus has been proposed which allows reproduction of a high density optical disk having a thin transparent substrate with a thickness of 0.6 mm and a standard density optical disk having a standard transparent substrate with a thickness of 1.2 mm by using a single optical pickup device. In the apparatus, an objective lens with a numerical aperture of 0.6 is employed which has been designed to reproduce the high density optical disk by a laser beam with a short wavelength. When the standard density optical disk is to be reproduced, an aspherical optical device is inserted on the side of a light source of the objective lens which is provided with an aperture for shielding the periphery of laser beam to decrease an effective numerical aperture of the objective lens.

Moreover, to change the effective numerical aperture of an objective lens selectively shielding the periphery of laser beam emitted from a semiconductor laser to collect laser beam, an apparatus has been disclosed in Japanese Patent Laying-Open No. 8-321065 which is provided with a liquid crystal selectively rotating the plane of polarization of laser beam and a polarizing plate allowing transmission of only laser beam which is polarized in a specific direction, and which can compatibly reproduce optical disks having substrates with different thicknesses. While the apparatus can compatibly reproduce the DVD and the CD-ROM having substrates of different thicknesses, it cannot reproduce the CD-R as a laser beam with a wavelength of 635 nm is employed. The reason is as follows.

FIG. 1 is a diagram showing a relation between a pit depth and intensity of reflected light for every laser beam with a different wavelength. As shown in FIG. 1, when the laser beam with a wavelength of 635 nm is employed, the intensity of reflected light is the highest with the pit depth of about 105 nm. On the other hand, when laser beam with a wavelength of 780 nm is employed, the intensity of reflected light is the highest with the pit depth of about 125 nm. In the case of the CD-R, reflectance significantly changes with the wavelength of laser beam as organic dye is used for a recording film and a sufficient intensity of reflected light cannot be obtained using a single-wavelength laser with a wavelength of 635 nm. Thus, the CD-R cannot be suitably reproduced. Therefore, a two wavelengths to beam laser is required for the optical pickup device capable of compatibly reproducing the DVD and the CD-R or the CD-ROM. When laser beam with a wavelength of 430 nm would be employed due to the trend of shorter wavelength in the near future, such a two wavelengths to beam laser would be even more highly required.

Therefore, it is an object of the present invention to provide an optical pickup device capable of performing recording and/or reproducing for optical disks having substrates with different thicknesses by using a laser beam with two different wavelengths.

DISCLOSURE OF THE INVENTION

According to the present invention, an optical pickup device performing recording and/or reproducing for a first optical disk having a first transparent substrate and a second optical disk having a second transparent substrate with a thickness which is smaller than that of the first transparent substrate includes an objective lens, a laser beam generating means and an optical device. The objective lens is arranged opposite to the first or second optical disk. The laser beam generating means selectively generates a first laser beam with a first wavelength and a second laser beam with a second wavelength which is different from the first wavelength. The optical device includes: a central region arranged between the objective lens and the laser beam generating means, allowing transmission of the first laser beam without any change and increasing the diameter of the second laser beam by diffraction; and a peripheral region allowing transmission of the first laser beam without any change and substantially shielding the second laser beam by diffraction or absorption.

Preferably, a hologram is formed in the central region of the optical device.

More preferably, the hologram includes a plurality of annular convex portions each having four steps and coaxially formed, where a height h1 of each step is determined in accordance with the following expressions (1) to (5).

$$\eta_m = \left| \frac{1}{T} \int_0^T A(x) \exp\{i\phi(x)\} \exp\left\{-i\left(\frac{2\pi m x}{T}\right)\right\} dx \right|^2 \quad (1)$$

-continued $$\text{if } 0 \leq x \leq \frac{T}{4} \quad \phi(x) = 0$$

$$\text{if } \frac{T}{4} \leq x \leq \frac{T}{2} \quad \phi(x) = \frac{2\pi}{\lambda}(n - n_0)h1 = \phi_0(\text{constant})$$

$$\text{if } \frac{T}{2} \leq x \leq \frac{3}{4}T \quad \phi(x) = \frac{4\pi}{\lambda}(n - n_0)h1 = 2\phi_0$$

$$\text{if } \frac{3}{4}T \leq x \leq T \quad \phi(x) = \frac{6\pi}{\lambda}(n - n_0)h1 = 3\phi_0$$

(2)

if $m = 0$ (3)

$$\eta_0 = \frac{1}{16}\{(1 + \text{COS}\phi(x) + \text{COS}2\phi(x) + \text{COS}3\phi(x))^2 + (\text{SIN}\phi(x) + \text{SIN}2\phi(x) + \text{SIN}3\phi(x))^2\}$$

if $m = -1$ (4)

$$\eta_{-1} = \frac{1}{4\pi^2}\{(1 - \text{COS}\phi(x) - \text{COS}2\phi(x) + \text{COS}3\phi(x) - \text{SIN}\phi(x) + \text{SIN}2\phi(x) + \text{SIN}3\phi(x))^2 + (1 + \text{COS}\phi(x) - \text{COS}2\phi(x) - \text{COS}3\phi(x) - \text{SIN}\phi(x) - \text{SIN}2\phi(x) + \text{SIN}3\phi(x))^2\}$$

if $m = 1$ (5)

$$\eta_{-1} = \frac{1}{4\pi^2}\{(1 - \text{COS}\phi(x) - \text{COS}2\phi(x) + \text{COS}3\phi(x) - \text{SIN}\phi(x) + \text{SIN}2\phi(x) + \text{SIN}3\phi(x))^2 + (1 + \text{COS}\phi(x) - \text{COS}2\phi(x) - \text{COS}3\phi(x) + \text{SIN}\phi(x) + \text{SIN}2\phi(x) + \text{SIN}3\phi(x))^2\}$$

Here, $\eta m$ is mth order diffraction efficiency, $\phi(x)$ is a function of phase difference defined by expression (2), T is a period of the function of phase difference, A(x) is transmittance, $\lambda$ is the first, or second wavelength, n is refractive index of the annular convex portion, $n_0$ is refractive index of the periphery of the annular convex portion and $\phi_0$ is a constant.

Preferably, a refraction grating is formed in the peripheral region of the optical device.

More preferably, the diffraction grating has varying grating constants.

Preferably, the laser beam generating means polarizes the first laser beam in a first direction and the second laser beam in a second direction which is different from the first direction. In the peripheral region of the optical device, a polarizing filter is formed having a polarizing direction which is perpendicular to the second direction.

Preferably, a polarizing glass is formed in the peripheral region of the optical device which absorbs the laser beam with the second wavelength.

Preferably, the laser beam generating means is a semiconductor laser including a package and first and second laser chips. The first laser chip is arranged within the package and oscillates the first laser beam. The second laser beam is arranged within the package and oscillates the second laser beam.

More preferably, the optical pickup device moves along two parallel guide shafts provided in a radial direction of the first or second optical disk, and includes a rising mirror and a body. The rising mirror is arranged immediately below the objective lens and the optical device, and reflects the first or second laser beam directed from the semiconductor laser in a direction which is parallel to the main surface of the first or second optical disk in a direction which is perpendicular to the main surface of the first or second optical disk. The body is supported between the two guide shafts and the objective lens accommodates the optical device, the semiconductor laser and the rising mirror. An optical axis of the laser beam entering the rising mirror is angled with respect to a perpendicular relative to the two guide shafts to form an acute angle.

More preferably, a line passing emittance openings of the first and second laser chips is angled with respect to the main surface of the first or second optical disk to form an acute angle which is equal to the above mentioned acute angle.

Preferably, the optical pickup device further includes a collimator lens arranged between the optical device and the semiconductor laser. The first laser chip is spaced by a first distance from the collimator lens such that the first laser beam transmitted through the collimator lens is collimated. The second laser chip is spaced by a second distance, which is different from the first distance, from the collimator lens such that the second laser beam transmitted through the collimator lens is collimated.

Preferably, the semiconductor laser further includes an optical waveguide. The optical waveguide includes a first incident opening facing the emittance opening of the first laser chip, a second incident opening facing the emittance opening of the second laser chip and an emittance opening communicating with the first and second incident openings.

Preferably, the first and second laser chips are arranged such that one sides thereof are adjacent to each other. The distances between the emittance openings of the first and second laser chips and the one sides are respectively shorter than the distances between the emittance openings and the other sides opposite to the one sides.

Preferably, the semiconductor laser further includes a photodetector arranged on the side opposite to the side of emittance of the first and second laser chips for monitoring both the first and second laser beams leaked from the first and second laser chips.

Preferably, the semiconductor laser further includes first to fourth terminals. The first terminal is connected to one electrodes of the first and second laser chips and the photodetector. The second terminal is connected to the other terminal of the second laser chip. The third terminal is connected to the other electrode of the second laser chip. The fourth terminal is connected to the other electrode of the photodetector.

Preferably, the first wavelength is between 620 nm and 680 nm and the second wavelength is between 765 nm and 795 nm.

Preferably, the objective lens is adapted to the first optical disk and has a numerical aperture of between 0.55 and 0.65.

Preferably, the objective lens has an effective numerical aperture of between 0.40 and 0.50 upon incidence of the second laser beam.

Thus, in recording and/or reproducing of the first optical disk, the first laser beam is transmitted through the optical device without any change and focused on a signal recording surface of the first optical disk by the objective lens. On the other hand, in recording and/or reproducing of the second optical disk, the periphery of the second laser beam is substantially shielded by the peripheral region of the optical device and the diameter of the central portion of the second laser beam is increased by the central region of the optical device, so that the second laser beam is focused on the signal recording surface of the second optical disk by the objective lens. Thus, the optical pickup device is capable of performing recording and/or reproducing for the first and second optical disks having substrates with different thicknesses.

BEST MODE FOR CARRYING OUT THE INVENTION

Figure 1:
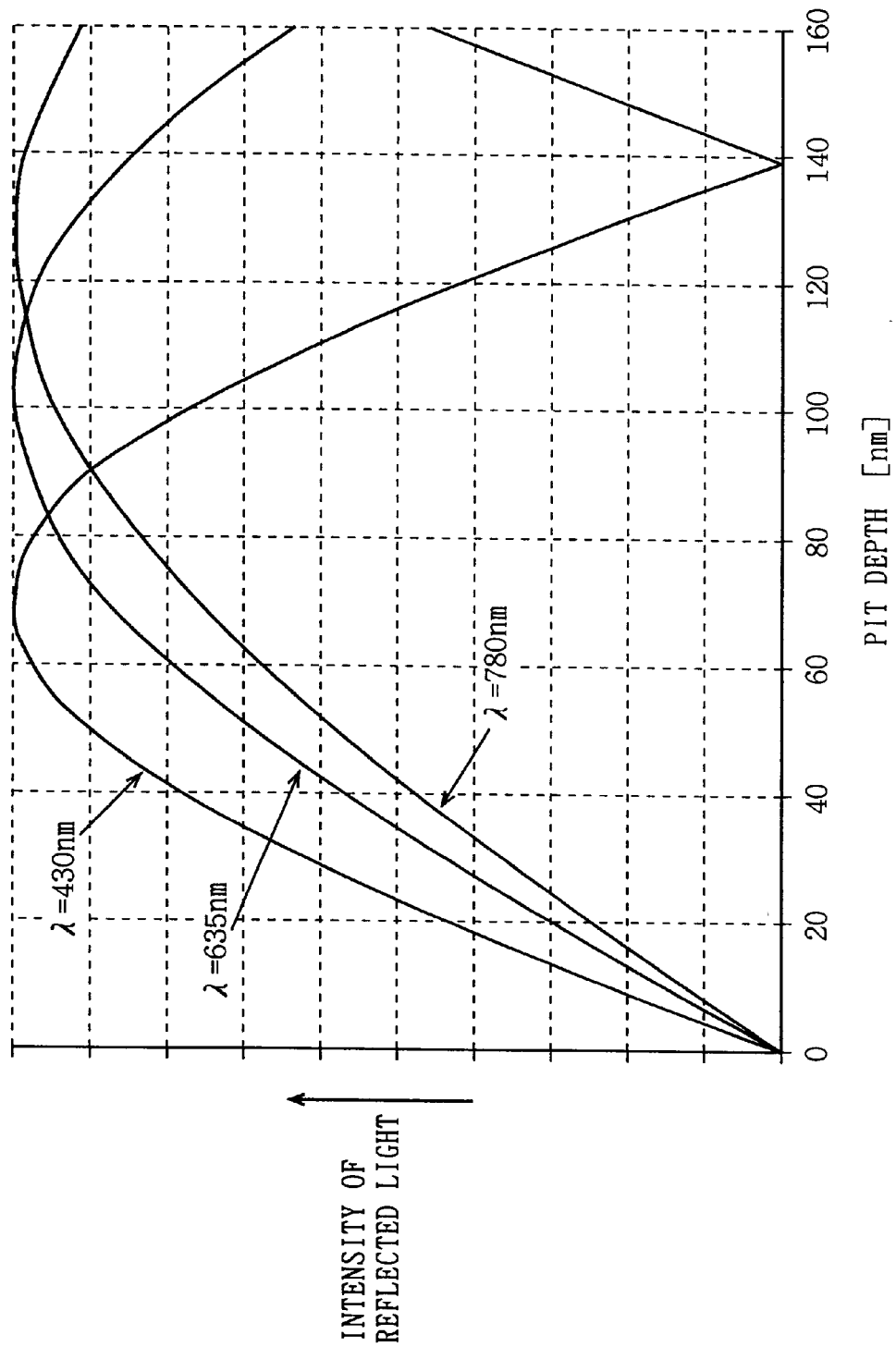
FIG. 1 is a diagram showing a relation between a pit depth of an optical disk and intensity of light reflected therefrom for every laser beam with a different wavelength.

The embodiments of the present invention will now be described in detail with reference to the drawings. It is noted that the same or corresponding portions in the drawings have the same reference numerals and the description thereof will not be repeated here.

Standard and Reproducing Condition for Subject Optical Disk

The following table shows a rated value and a reproducing condition for a CD-ROM, a CD-R and a DVD, which are compatibly reproduced by an optical pickup device according to an embodiment of the present invention.

TABLE

| Type | CD-ROM | CD-R | DVD |
|---|---|---|---|
| Rated Value | | | |
| Substrate Thickness on Reading Side | 1.2 mm (1.1~1.3 mm) | 1.2 mm (1.1~1.3 mm) | 0.6 mm (0.55~0.65 mm) |
| Minimum Pit Length | 0.90 μm (0.8~1.0 μm) | 0.90 μm (0.8~1.0 μm) | 0.40 μm (0.3~0.5 μm) |
| Track Pitch | 1.6 μm (1.5~1.7 μm) | 1.6 μm (1.5~1.7 μm) | 0.74 μm (0.73~0.75 μm) |
| Reflectance | At least 60~70% | At least 60~70% | At least 20~40% 70% |
| Reproducing Condition | | | |
| Spot Diameter | 1.5 μm (1.4~1.6 μm) | 1.5 μm (1.4~1.6 μm) | 0.9 μm (0.85~0.95 μm) |
| Numerical aperture | 0.45 (0.40~0.50) | 0.45 (0.40~0.50) | 0.60 (0.55~0.65) |
| Wavelength | 780 (765~795) | 780 (765~795) | 635 (620~680) |

As shown in the table, for the CD-ROM, a thickness of a substrate is 1.2 (with tolerance of ±0.1)mm, a minimum pit length is 0.90 (with tolerance of ±0.1)μm, a track pitch is 1.6 (with tolerance of ±0.1)μm and a reflectance is at least 60% to 70% for a laser beam with a wavelength of 780 nm. Further, a spot diameter of the laser beam during reproduction is 1.5 (with tolerance of ±0.1)μm, a numerical aperture of an objective lens is 0.45 (with tolerance of ±0.05) and a wavelength of the laser beam is 780 (with tolerance of ±15)nm. The CD-R has the same thickness of substrate, minimum pit length, track pitch, reflectance, spot diameter during reproduction, numerical aperture of objective lens and wavelength of laser beam as those for the above mentioned CD-ROM.

On the other hand, for the DVD, a thickness of substrate is 0.6 (with tolerance of ±0.05)mm, a minimum pit length is 0.40 (with tolerance of ±0.1)μm, a track pitch is 0.74 (with tolerance of ±0.0)μm and a reflectance is at least 70% (in the case of one layer DVD) or at least 20% to 40% (in the case of two layered DVD) for a laser beam with a wavelength of 635 nm. Further, a spot diameter of the laser beam during reproduction is 0.9 (with tolerance of ±0.5)μm, a numerical aperture of an objective lens is 0.60 (with tolerance of ±0.05) and a wavelength of the laser beam is 635 (with tolerance of 620 to 680)nm.

Structure of Optical Pickup Device

Figure 2:
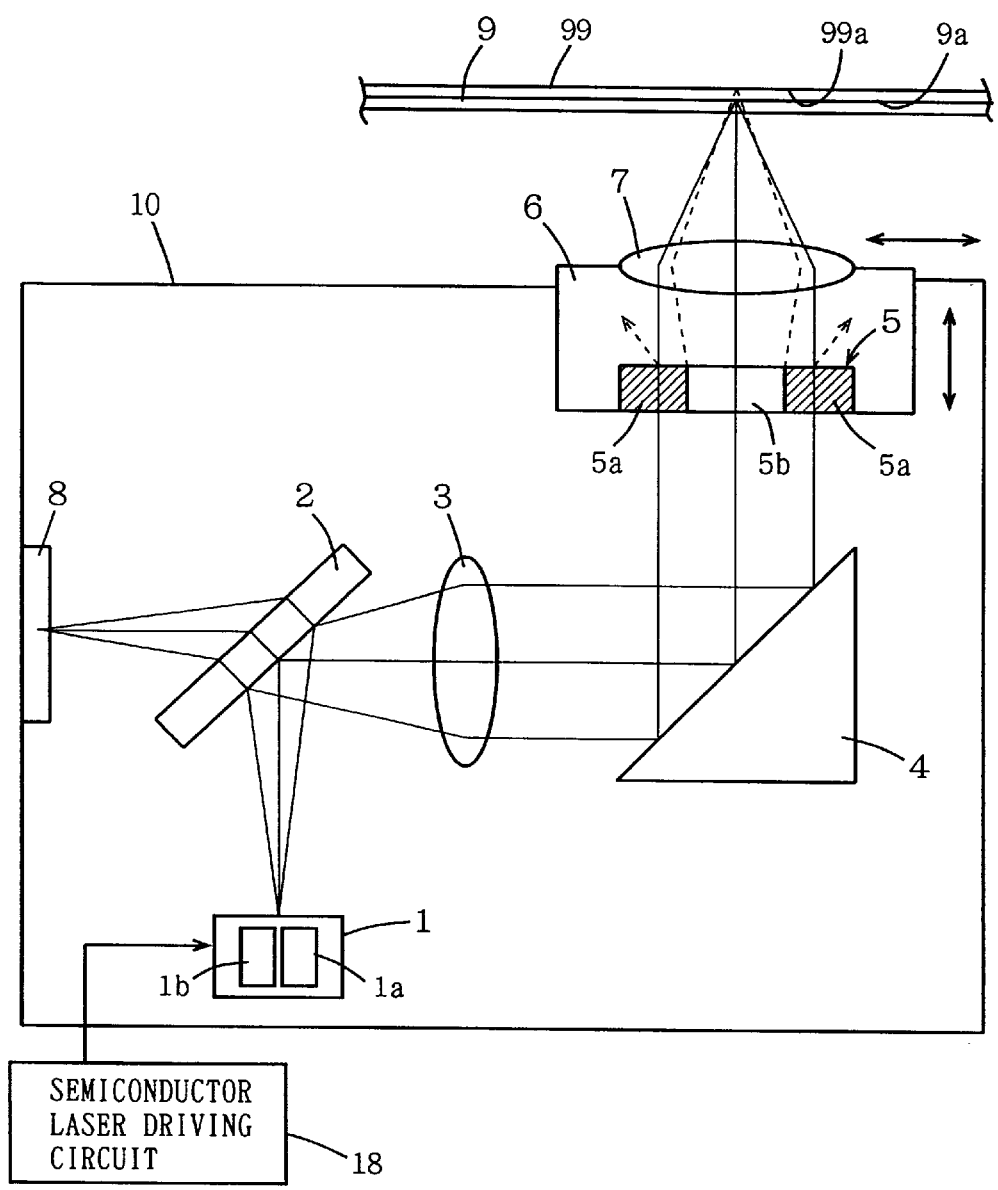
FIG. 2 is a diagram showing a structure of an optical pickup device in accordance with an embodiment of the present invention.

Referring to FIG. 2, an optical pickup device 10 according to an embodiment of the present invention includes: an objective lens 7 arranged opposite to an optical disk; a semiconductor laser 1 selectively generating laser beams with wavelengths of 635 (with tolerance of ±15)nm and 780 (with tolerance of ±15)nm; an optical device 5 arranged immediately below objective lens 7; an actuator 6 holding both objective lens 7 and optical device 5; a mirror 4 arranged immediately below objective lens 7 and optical device 5 for reflecting a laser beam directed from semiconductor laser 1 in a direction parallel to a main surface of the optical disk in a direction perpendicular to the main surface of the optical disk; a half mirror 2 perpendicularly reflecting the laser beam directed from semiconductor laser 1 toward rising mirror 4; a collimator lens 3 arranged between rising mirror 4 and half mirror 2 for collimating the laser beam directed from semiconductor laser 1; and a photodetector 8 receiving the laser beam reflected by the optical disk.

Thus, half of the laser beam emitted from semiconductor laser 1 is reflected by half mirror 2 toward collimator lens 3 for collimation and reflection by rising mirror 4. The reflected laser beam is collected by objective lens 7 through optical device 5 and focused on a signal recording surface 9a or 99a through a transparent substrate 9 of the DVD or a transparent substrate 99 of the CD including polycarbonate. The laser beam reflected by signal recording surface 9a or 99a travels back to half mirror 2 through transparent substrate 9 or 99, objective lens 7, optical device 5, mirror 4 and collimator lens 3. Half of the laser beam is transmitted through half mirror 2 and detected by photodetector 8.

Here, objective lens 7 is adapted to the DVD and has a numerical aperture of 0.60 (with tolerance of ±0.05). In other words, objective lens 7 is designed to focus the collimated laser beam with the wavelength of 635 nm on signal recording surface 9a of the DVD.

Semiconductor laser 1 further includes laser chips 1a and 1b oscillating laser beams with the wavelengths of 635 nm and 780 nm, respectively. In reproducing the DVD, laser chip 1a is activated by a semiconductor laser driving circuit 18. In reproducing the CD-ROM or the CD-R, laser chip 1b is activated by semiconductor laser driving circuit 18.

Figure 3:
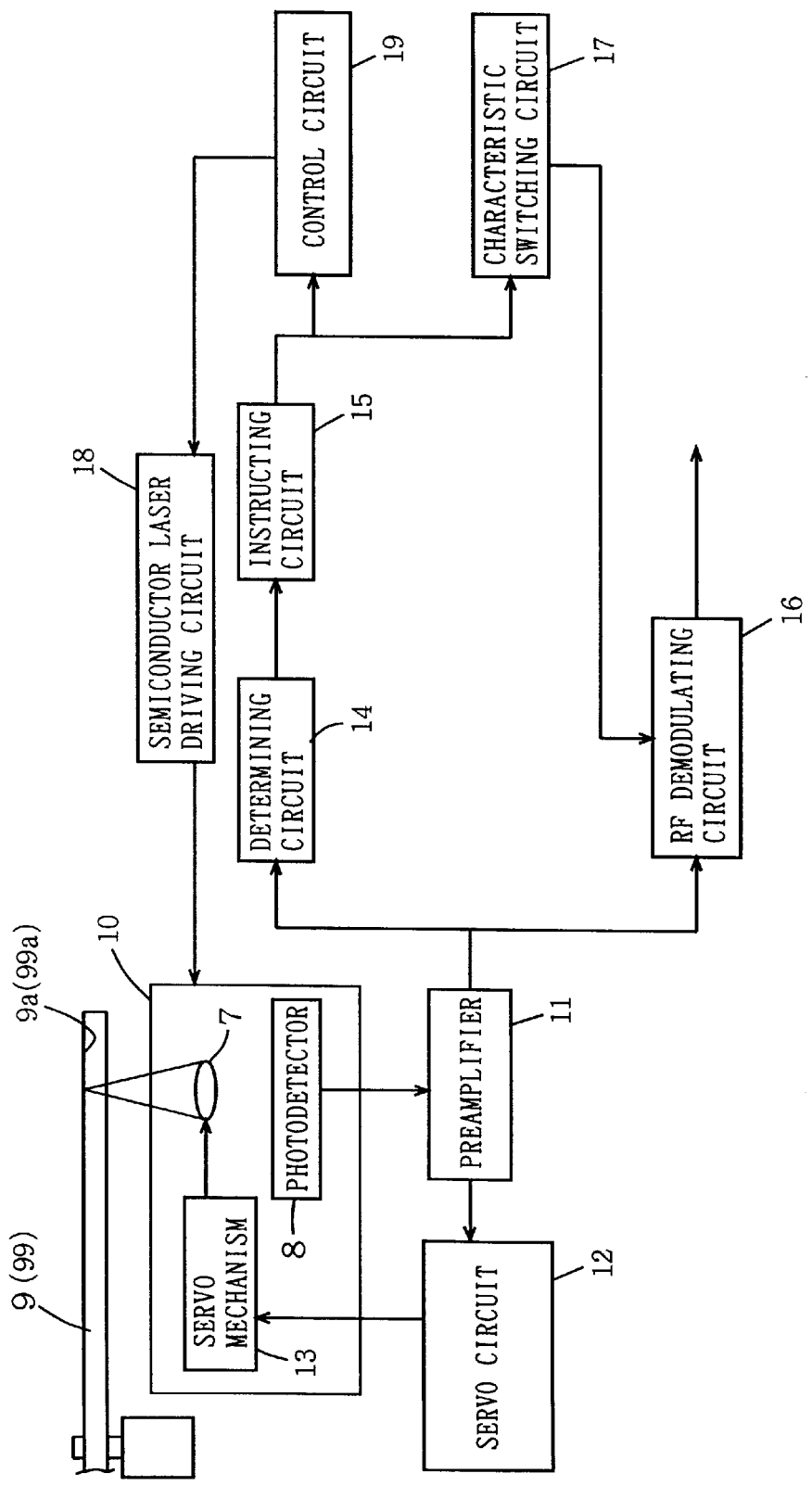
FIG. 3 is a block diagram showing an overall arrangement of an optical disk reproducing apparatus including the optical pickup device shown in FIG. 1.

As shown in FIG. 3, optical pickup device 10 further includes a servo mechanism 13 performing focusing control and tracking control for objective lens 7. The focusing control allows objective lens 7 to be perpendicularly moved with respect to the main surface of the optical disk such that the laser beam is always focused on signal recording surface 9a or 99a. In addition, the tracking control allows objective lens 7 to be perpendicularly moved with respect to the direction in which a track is moved such that the laser beam is always directed on the track.

An optical disk reproducing apparatus using the above mentioned optical pickup device 10 includes a preamplifier 11, a servo circuit 12, a determining circuit 14, an instructing circuit 15, an RF demodulating circuit 16, a characteristic switching circuit 17, semiconductor laser driving circuit 18 and a control circuit 19.

Photodetector 8 detects the laser beam reflected by signal recording surface 9a or 99a to generate a reproduced signal, which is then applied to preamplifier 11. The reproduced signal is applied to determining circuit 14, the RF demodulating circuit and servo circuit 12 after it is amplified by preamplifier 11. Servo circuit 12 controls a servo mechanism 13 in response to a focusing error signal and a tracking error signal of the applied reproduced signal 10. On the other hand, determining circuit 14 identifies the type (the DVD, CD-ROM or CD-R) of the optical disk mounted to the apparatus in response to the applied reproduced signal, and applies the identification result to instructing circuit 15. Instructing circuit 15 switches laser chips 1a and 1b of semiconductor laser 1 for adapting to the identified optical disk and thus applies an instruction to control circuit 19 in accordance with the applied identification result. As instructing circuit 15 also switches RF demodulating circuit 16 for adapting to reproduction of the identified optical disk and thus applies an instruction also to characteristic switching circuit 17 in accordance with the applied identification result. Control circuit 19 controls semiconductor laser driving circuit 18 such that laser chips 1a and 1b are switched in accordance with the instruction from instructing circuit 15. Characteristic switching circuit 17 switches the characteristic of RF demodulating circuit 16 for performing reproduction suitable for the optical disk mounted to the apparatus in accordance with the instruction from instructing circuit 15.

Figure 4:
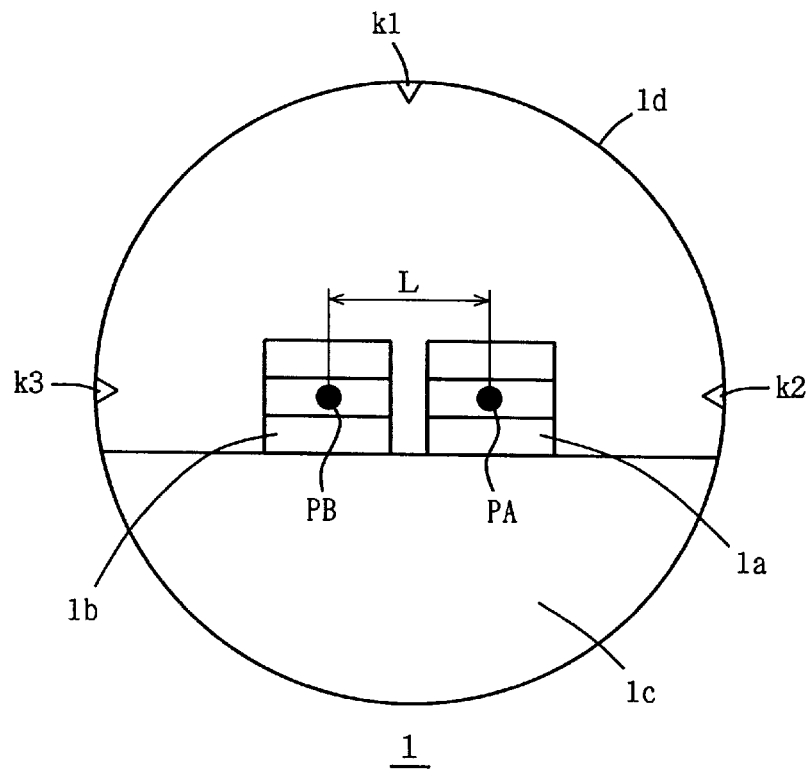
FIG. 4 is a top view showing a structure of a semiconductor laser shown in FIG. 2.

Referring to FIG. 4, semiconductor laser 1 includes, in addition to laser chips 1a and 1b, a base 1c to which these laser chips 1a and 1b are mounted, and a package 1d for accommodating laser chips 1a and 1b and base 1c. Three notches k1, k2 and k3 are formed in package 1d and laser chips 1a and 1b are mounted such that their emittance openings PA and PB are arranged on an imaginary line between notches k2 and k3. Semiconductor laser 1 is positioned such that the spots which are formed by laser beams from laser chips 1a and 1b on signal recording surface 9a or 99a are symmetrically arranged on either side of the track. More specifically, semiconductor laser 1 is positioned such that the direction of k2–k3 corresponds to the direction of tracking (the radial direction) of the optical disk. The arrangement will be later described in detail.

It is noted that while the above mentioned laser chips 1a and 1b are separately manufactured and mounted to base 1c, they may also be manufactured together by crystal growth on a single semiconductor substrate. In addition, a distance L between emittance openings PA and PB of laser chips 1a and 1b is for example between 100 $\mu$m and 500 $\mu$m.

Figure 5:
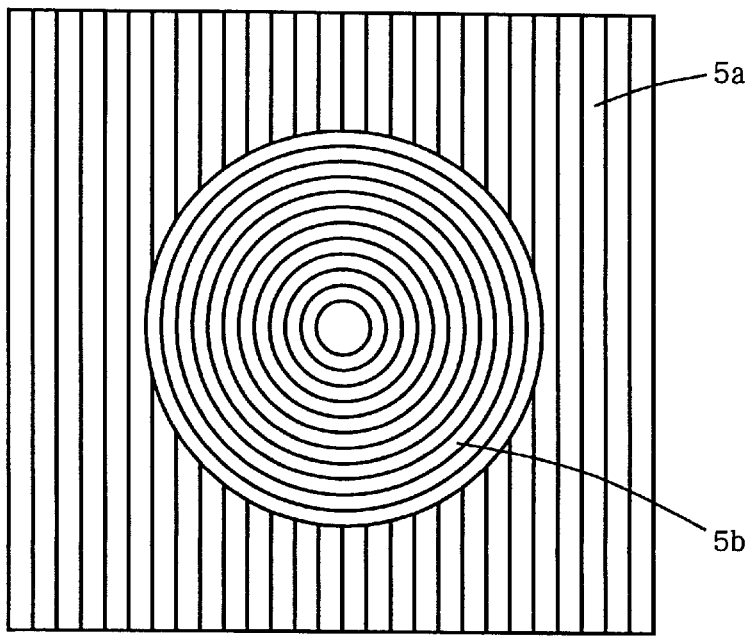
FIG. 5 is a top view of an optical device shown in FIG. 2.
Figure 6:
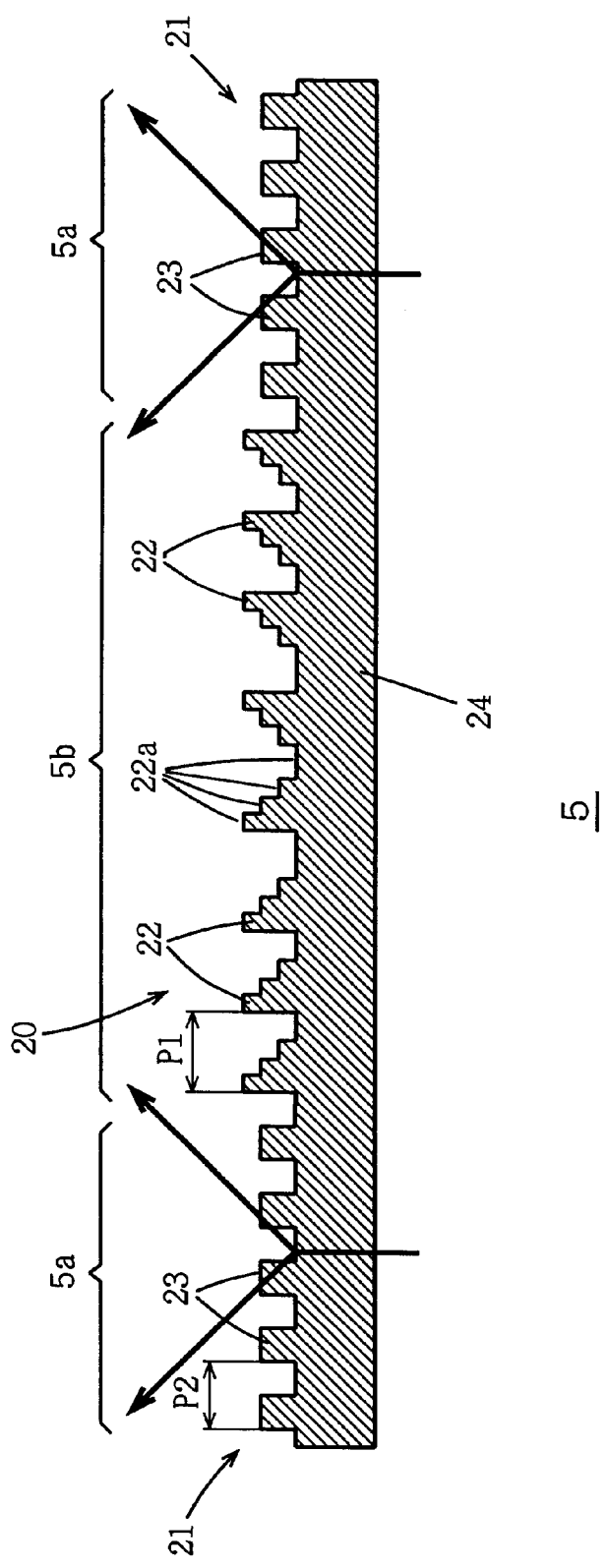
FIG. 6 is a cross sectional view of the optical device shown in FIG. 5.
Figure 7:
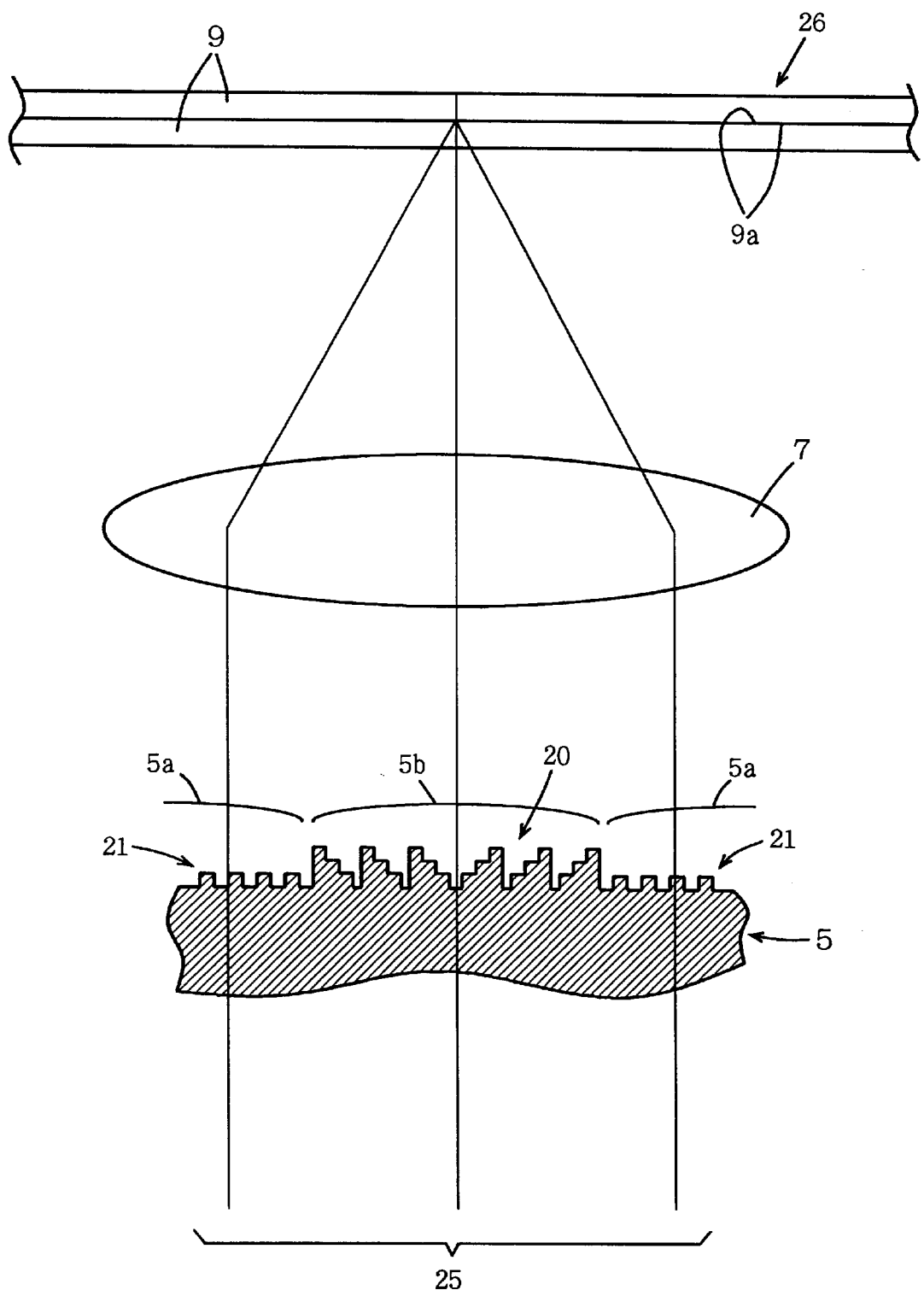
FIG. 7 is a diagram showing an optical path when a laser beam with a wavelength of 635 nm enters the optical device shown in FIGS. 5 and 6.

Referring to FIGS. 5 to 7, optical device 5 has a central region 5b in a round shape and a peripheral region 5a thereof. Central region 5b allows transmission of the laser beam with the wavelength of 635 nm without any change and increases a diameter of the laser beam with the wavelength of 780 nm by diffraction. Thus, a hologram 20 is formed in central region 5b. On the other hand, peripheral region 5a allows transmission of the laser beam with the wavelength of 635 nm without any change and substantially shields the laser beam with the wavelength of 780 nm by diffraction. Therefore, a diffraction grating 21 is formed in peripheral region 5a.

As shown in FIG. 6, a cross section of central region 5b of optical device 5 has protrusions generally in triangular forms, whereas a cross section of peripheral region 5a has protrusions in square-like forms. More specifically, hologram 20 in central region 5b includes a coaxially formed plurality of annular convex portions 22. Each annular convex portion 22 has four steps 22a. Pitches P1 of annular convex portions 22 become narrower as closer to the peripheral region so that hologram 20 is provided with a lens effect. A height of each step 22a is determined so that hologram 20 functions as a lens only for the laser beam with the wavelength of 780 nm. The height of each step 22a will later be described in detail. On the other hand, diffraction grating 21 in peripheral region 5a includes a plurality of convex portions in a striped pattern (hereinafter referred to as striped convex portions) 23 which are formed in the same direction. As striped convex portions 23 are formed with constant pitches P2 (preferably between 8 $\mu$m and 12 $\mu$m), diffraction grating 21 has the same diffraction constants. A height of striped convex portion 23 is also determined such that diffraction grating 21 functions only for the laser beam with the wavelength of 780 nm. The height of striped convex portion 23 will also be later described in detail. It is noted that optical device 5 with such structure can readily be manufactured by etching a glass 24.

Referring to FIGS. 7 to 12, the function of optical device 5 will now be described.

As shown in FIG. 7, when a collimated laser beam 25 with the wavelength of 635 nm enters optical device 5, the entered laser beam 25 is transmitted through optical device 5 without any diffraction. This is because optical device 5 does not function at all for laser beam 25 with the wavelength of 635 nm. The transmitted laser beam 25 enters and is collected by objective lens 7 and is focused on signal recording surface 9a of DVD 26. It is noted that in FIG. 7, a part of a cross section of optical device 5 is shown in enlargement.

Figure 8:
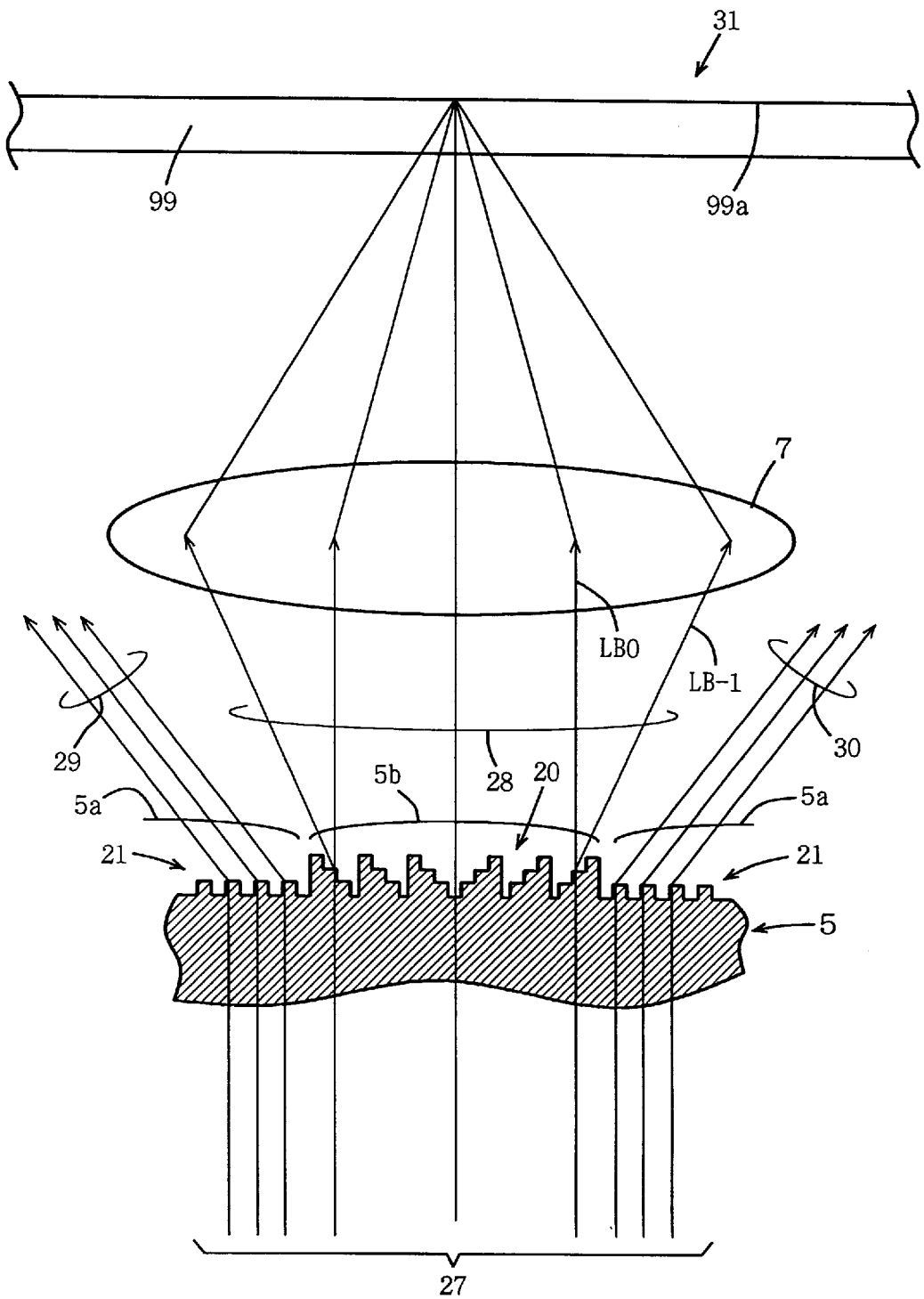
FIGS. 8 to 12 are diagrams showing optical paths when a laser beam with a wavelength of 780 nm enters the optical device shown in FIGS. 5 and 6.
Figure 9:
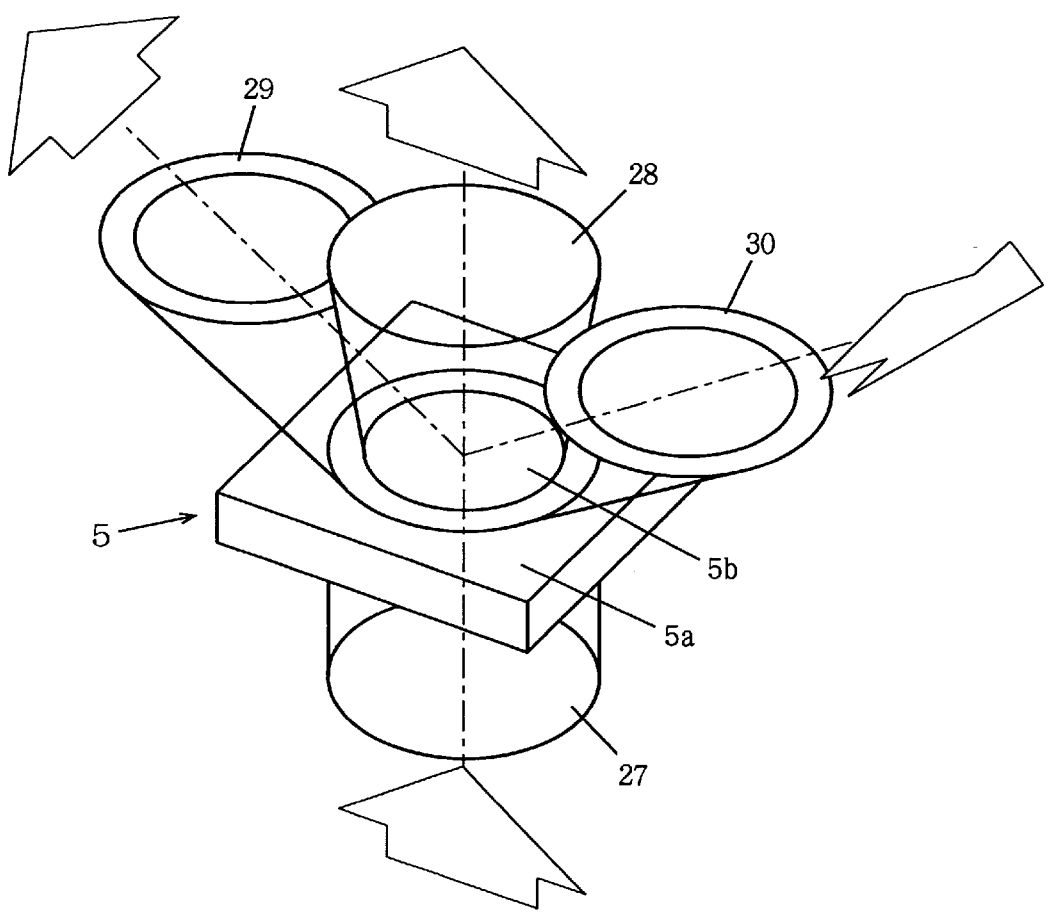
Figure 10:
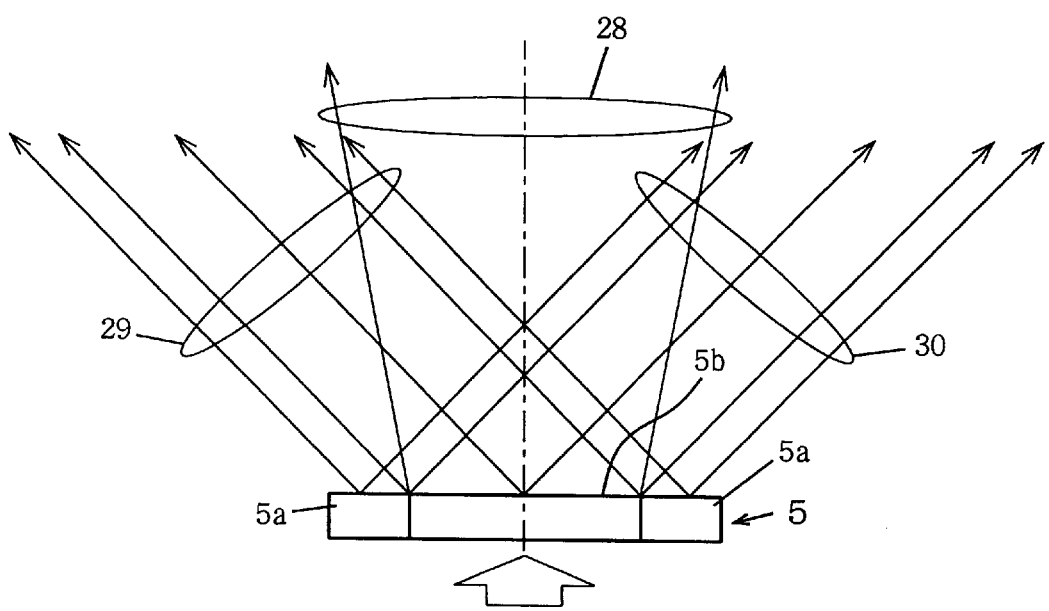

On the other hand, as shown in FIGS. 8 and 9, when collimated laser beam 27 with the wavelength 780 nm enters optical device 5, laser beam 28 of laser beam 27, which has been transmitted through optical device 5, outwardly travels while increasing its diameter. In addition, as the diameter of laser beam 27 entering optical device 5 is larger than that of central region 5b, laser beam 27 also enters peripheral region 5a. Diffraction grating 21 is formed in peripheral region 5a so that the periphery of laser beam 27 is greatly diffracted toward both right and left sides around laser beam 28. More specifically, +first order diffraction beam 29 due to diffraction grating 21 travels toward the left with respect to laser beam 28 in the drawing. Meanwhile, –first order diffraction beam 30 due to diffraction grating 21 travels toward the right with respect to laser beam 28 in the drawing. Thus, only laser beam 28 which has been transmitted through central region 5b of optical device 5 is transmitted to and collected by objective lens 7 and is focused on signal recording surface 99a of the CD-ROM. As laser beams 29 and 30 which have been transmitted through peripheral region 5a of optical device 5 are greatly diffracted by diffraction grating 21 formed in peripheral region 5a, they do not enter objective lens 7. In other words, the periphery of laser beam 27 with the wavelength 780 nm, which has been transmitted to optical device 5, is substantially shielded by peripheral region 5a of optical device 5.

Here, laser beam 28 transmitted through optical device 5 and traveling outwardly while increasing its diameter is –first order diffraction beam LB-1. Strictly speaking, besides –first order diffraction beam LB-1, there are 0th order diffraction beam LB0, +first order diffraction beam (not shown) or the like. However, the intensity of such diffraction beam is kept as low as possible. The outwardly traveling –first order diffraction beam LB1 is employed due to the following reason. That is, as objective lens 7 is designed for DVD 26, merely shielding of the periphery of laser beam 27 with the wavelength of 780 nm does not allow accurate focusing of the laser beam, which has been transmitted through objective lens 7 in parallel, onto signal recording surface 99a of CD-ROM 31. Thus, aberration is caused. Therefore, a diameter of central region 5b of optical device 5 and a shape of hologram 20 formed in central region 5b are determined such that an effective numerical aperture of objective lens 7 for 0th order diffraction beam LB0 and –first order diffraction beam LB-1 is 0.45. It is noted that, in FIG. 8, a part of the cross section of optical device 5 is shown in enlargement.

Figure 11:
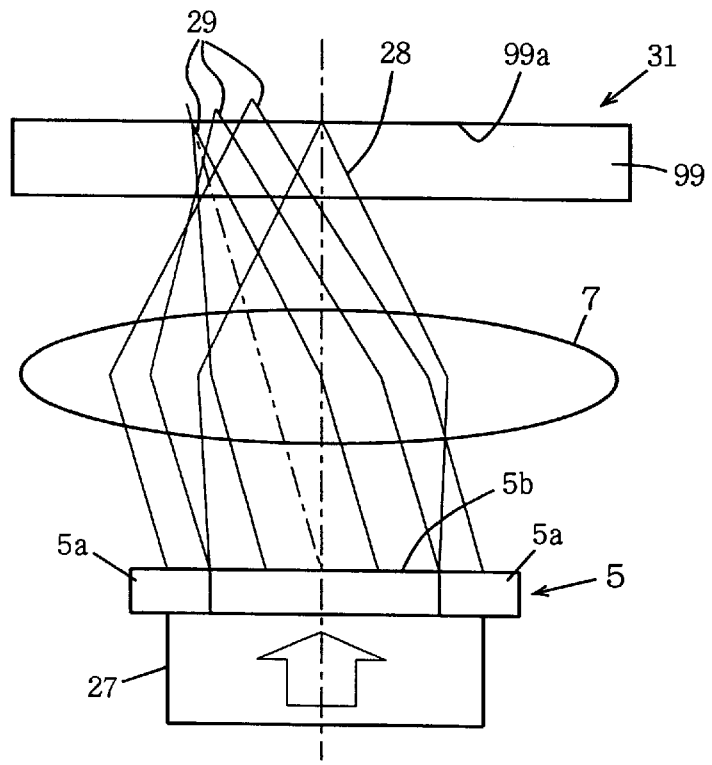
Figure 12:
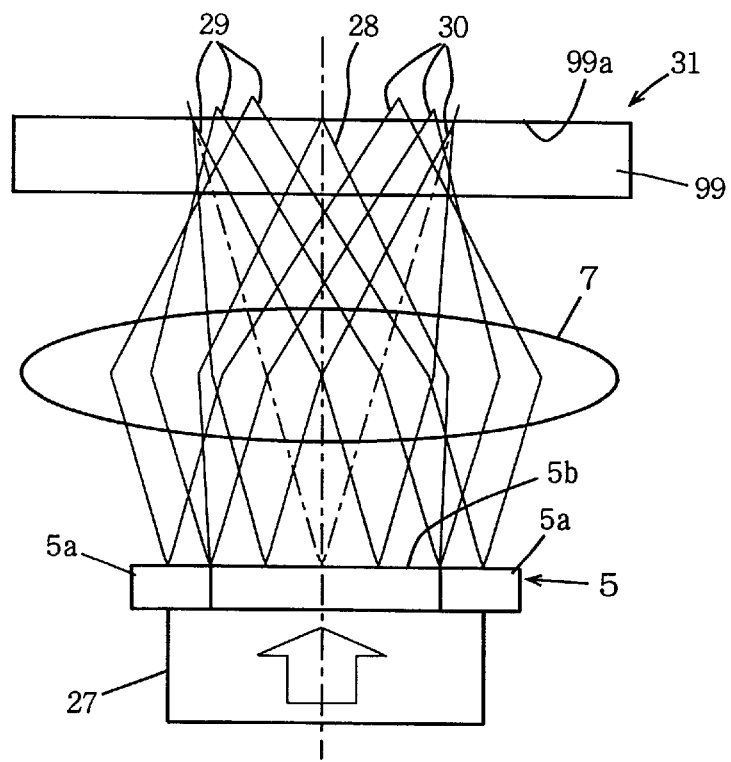

In the above description, while laser beams 29 and 30 transmitted through peripheral region 5a of optical device 5 are diffracted so that they do not enter objective lens 7, as shown in FIGS. 11 and 12, even if laser beams 29 and 30 enter objective lens 7, they are not focused on the same point.

Optical device 5 is fixed to actuator 6 for holding objective lens 7 as shown in FIG. 2. Actuator 6 is connected to servo mechanism 13 shown in FIG. 3. Servo mechanism 13 is responsive to a focusing error signal from photodetector 8 for moving actuator 6 in a direction of an optical axis, and is responsive to a tracking error signal from photodetector 28 for moving actuator 6 in the radial direction of the optical disk. As optical device 5 is thus fixed to objective lens 7, it moves along with objective lens 7.

As described above, optical device 5 substantially shields the periphery of laser beam 27 with the wavelength of 780 nm and diffracts the central portion of laser beam 27 outwardly to increase its diameter, thereby focusing laser beam 27 on signal recording surface 99a of CD-ROM 31. In addition, optical device 5 allows transmission of the laser beam with the wavelength of 635 nm without any diffraction, thereby focusing laser beam 25 on signal recording surface 9a of DVD 26.

Figure 13:
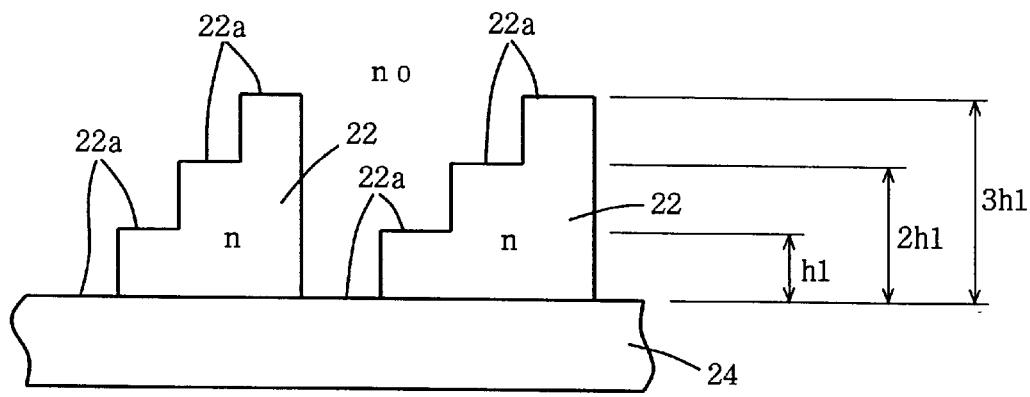
FIG. 13 is a cross sectional view showing in enlargement a central region of the optical device shown in FIG. 6.

Now, a method of determining a height h1 of each step 22a of annular convex portion 22 having four steps as shown in FIG. 13 will be described.

Figure 14:
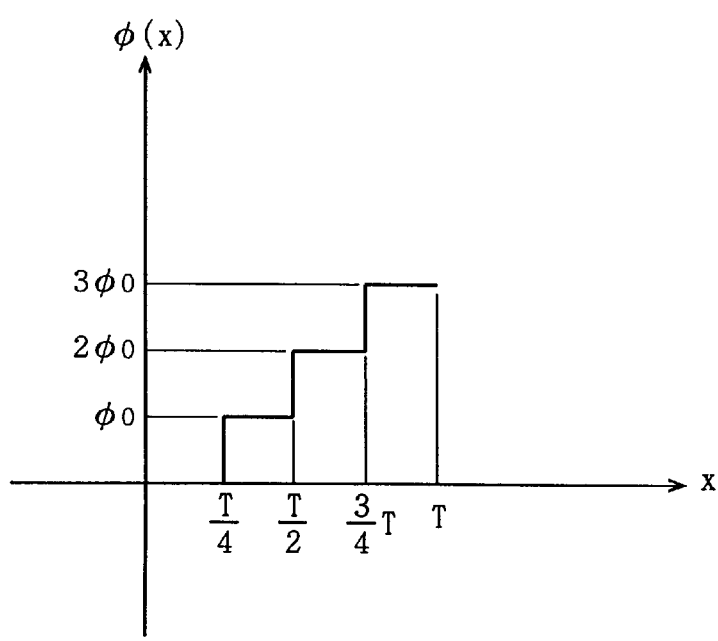
FIG. 14 is a diagram showing a function of phase difference used for determining a height of each step of annular convex portions in a hologram shown in FIG. 13.

First, a function of phase difference φ(x) as shown in FIG. 14 is assumed. When a period T of the function of phase difference is significantly large as compared with a wavelength λ of the laser beam and a thickness of the diffraction region, mth order diffraction efficiency ηm is generally provided in accordance with the following expression (1).

$$\eta_m = \left| \frac{1}{T} \int_0^T A(x) \exp\{i\phi(x)\} \exp\left\{-i\left(\frac{2\pi mx}{T}\right)\right\} dx \right|^2 \quad (1)$$

Here, A(x) is a transmittance at x. A(x)=1 is hereinafter assumed.

The function of phase difference φ(x) shown in FIG. 14 is provided in accordance with the following expressions (2).

$$\begin{aligned}
&\text{if } 0 \leq x \leq \frac{T}{4} \quad \phi(x) = 0 \\
&\text{if } \frac{T}{4} \leq x \leq \frac{T}{2} \quad \phi(x) = \frac{2\pi}{\lambda}(n - n_0)h1 = \phi_0 \text{(constant)} \\
&\text{if } \frac{T}{2} \leq x \leq \frac{3}{4}T \quad \phi(x) = \frac{4\pi}{\lambda}(n - n_0)h1 = 2\phi_0 \\
&\text{if } \frac{3}{4}T \leq x \leq T \quad \phi(x) = \frac{6\pi}{\lambda}(n - n_0)h1 = 3\phi_0
\end{aligned} \quad (2)$$

Here, n is a refractive index of the material of annular convex portion 22 in hologram 20 and $n_0$ is a refractive index in the vicinity of annular convex portion 22 (usually a refractive index of air).

Diffraction efficiencies where m=0 and m=±1 are as follows.

$$\text{if } m = 0 \quad (3)$$

$$\eta_0 = \frac{1}{16}\{(1 + \cos\phi(x) + \cos 2\phi(x) + \cos 3\phi(x))^2 + (\sin\phi(x) + \sin 2\phi(x) + \sin 3\phi(x))^2\}$$

$$\text{if } m = -1 \quad (4)$$

$$\eta_{-1} = \frac{1}{4\pi^2}\{(1 - \cos\phi(x) - \cos 2\phi(x) + \cos 3\phi(x) - \sin\phi(x) + \sin 2\phi(x) + \sin 3\phi(x))^2 + (1 + \cos\phi(x) - \cos 2\phi(x) - \cos 3\phi(x) - \sin\phi(x) - \sin 2\phi(x) + \sin 3\phi(x))^2\}$$

$$\text{if } m = 1 \quad (5)$$

$$\eta_{-1} = \frac{1}{4\pi^2}\{(1 - \cos\phi(x) - \cos 2\phi(x) + \cos 3\phi(x) - \sin\phi(x) + \sin 2\phi(x) + \sin 3\phi(x))^2 + (1 + \cos\phi(x) - \cos 2\phi(x) - \cos 3\phi(x) + \sin\phi(x) + \sin 2\phi(x) + \sin 3\phi(x))^2\}$$

Figure 15:
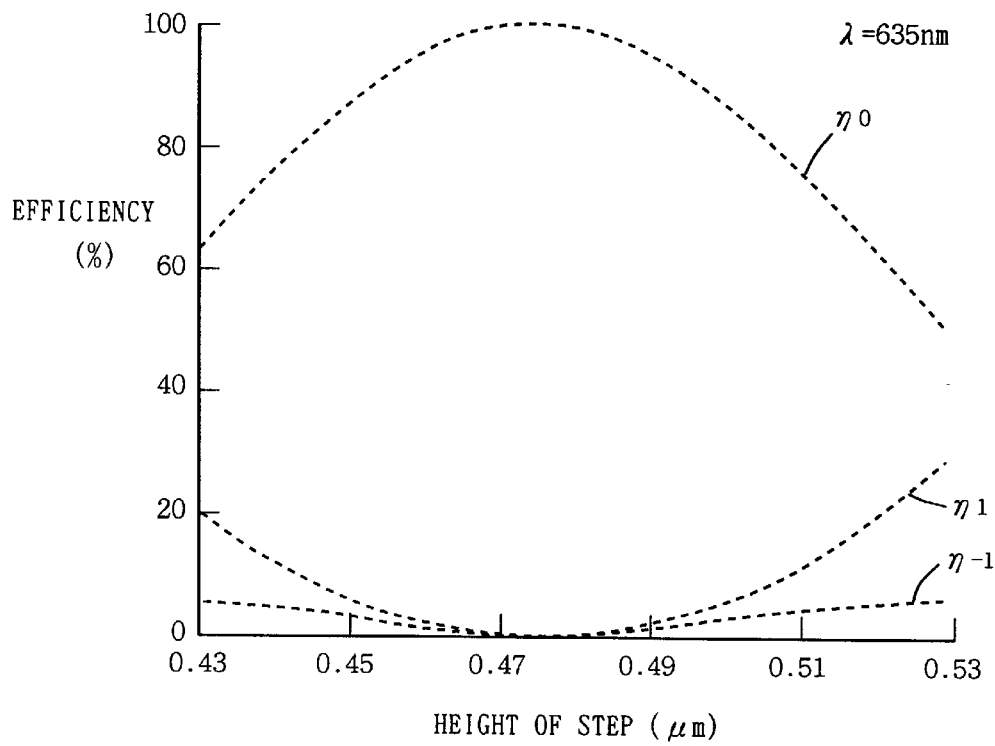
FIG. 15 is a diagram showing a relation between a height of each step of annular convex portions in the hologram and 0th and ± first order diffraction efficiencies for the laser beam with the wavelength of 635 nm.

FIG. 15 is a diagram showing a relation between height h1 of each step 22a and diffraction efficiency ηm where λ=635 nm, n=2.3368 and $n_0$=1. As is apparent from FIG. 15, when h=0.475 μm, 0th order diffraction efficiency η0 of the laser beam with the wavelength of 635 nm is the highest and −first order diffraction efficiency η−1 and +first order diffraction efficiency η1 are the lowest.

Figure 16:
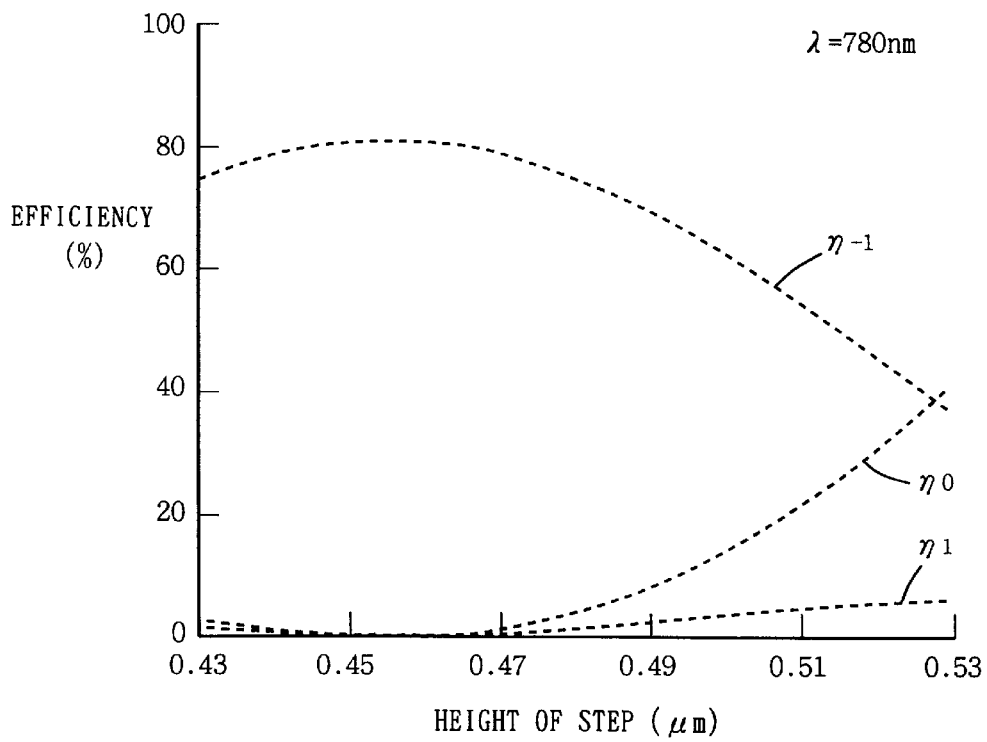
FIG. 16 is a diagram showing a relation between a height of each step of annular convex portions in the hologram and 0th and ± first order diffraction efficiencies for the laser beam with the wavelength of 780 nm.

FIG. 16 is a diagram showing a relation between height h1 of each step 22a and diffraction efficiency ηm where λ=780 nm, n=2.3368 and n0=1. As is apparent from FIG. 16, when h=0.455 μm, −first order diffraction efficiency η−1 of the laser beam with the wavelength of 780 nm is the highest and 0th order diffraction efficiency η0 and +first order diffraction efficiency η1 are the lowest.

Figure 17:
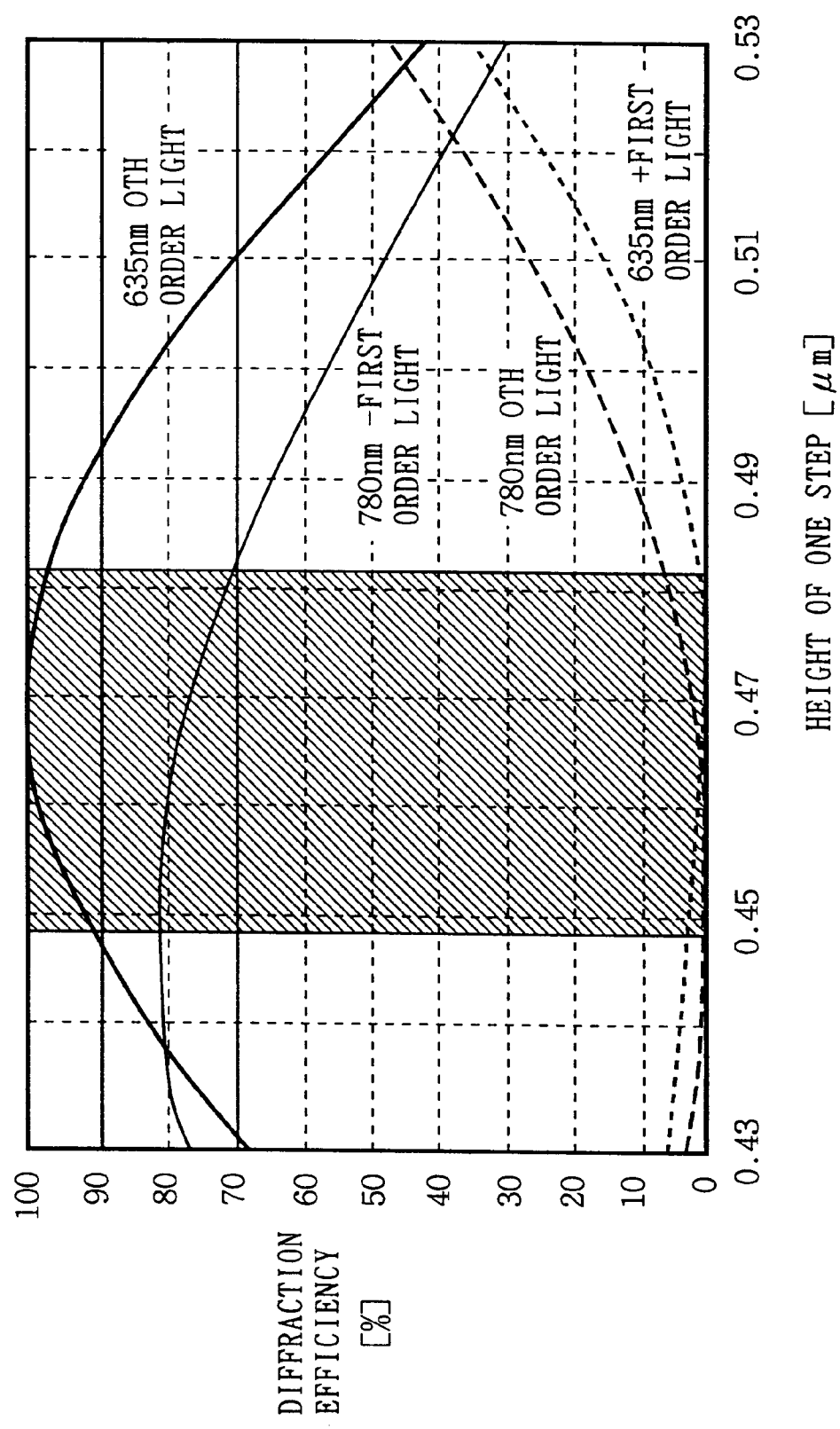
FIG. 17 is a diagram collectively showing the diffraction efficiencies shown in FIGS. 15 and 16 for determining the height of each step of annular convex portions.

As described above, height h1 is determined such that 0th order diffraction beam of the laser beam with the wavelength of 635 nm and −first order diffraction beam of the laser beam with the wavelength of 780 nm are large. As shown in FIG. 17, for example, height h1 must be between 0.448 μm and 0.482μm to make 0th order diffraction efficiency η0 for the wavelength of 635 nm at least 90% and −first order diffraction efficiency η−1 for the wavelength of 780 nm at least 70%.

Now, a method of determining a height h2 of striped convex portion 23 in diffraction grating 21 formed in peripheral region 5a of optical device 5 will be described. Height h2 is determined in accordance with the following expression (6). Here, m is an integer, λ is a wavelength of a laser beam to be transmitted without any diffraction, n is a refractive index of a material for striped convex portion 23 in diffraction grating 21 and n0 is a refractive index in the vicinity of striped convex portion 23 (usually a refractive index of air).

$$h2 = m \times \lambda/(n - n0) \quad (6)$$

Given that m=1, λ=635 nm, n=2.3368 and n0=1, then h2=0.475 μm.

By determining height h2 as described above, diffraction grating 21 with wavelength selectivity, which allows transmission of the laser beam with the wavelength of 635 nm without any diffraction and allows diffraction of the laser beam with the wavelength of 780 nm, is formed.

It is noted that diffraction grating 21 may be provided with wavelength selectivity by forming on diffraction grating 21 a film of cyanine dye having a refractive index which changes with a wavelength. Cyanine dye has a refractive index of 1.50 for the laser beam of the wavelength of 635 nm and a refractive index of 1.65 for the laser beam with the wavelength of 780 nm. On the other hand, diffraction grating 21 formed of glass has a refractive index of 1.50 for the laser beam of the wavelength of either 635 nm or 780 nm. Thus, the diffraction grating does not function for the laser beam with the wavelength of 635 nm. Accordingly, the diffraction grating with wavelength selectivity, which allows diffraction of the laser beam with the wavelength of 780 nm but not of the laser beam with the wavelength of 635 nm, is formed.

Operation of Optical Pickup Device

The operation of the optical pickup device having the above mentioned structure will now be described.

Figure 18:
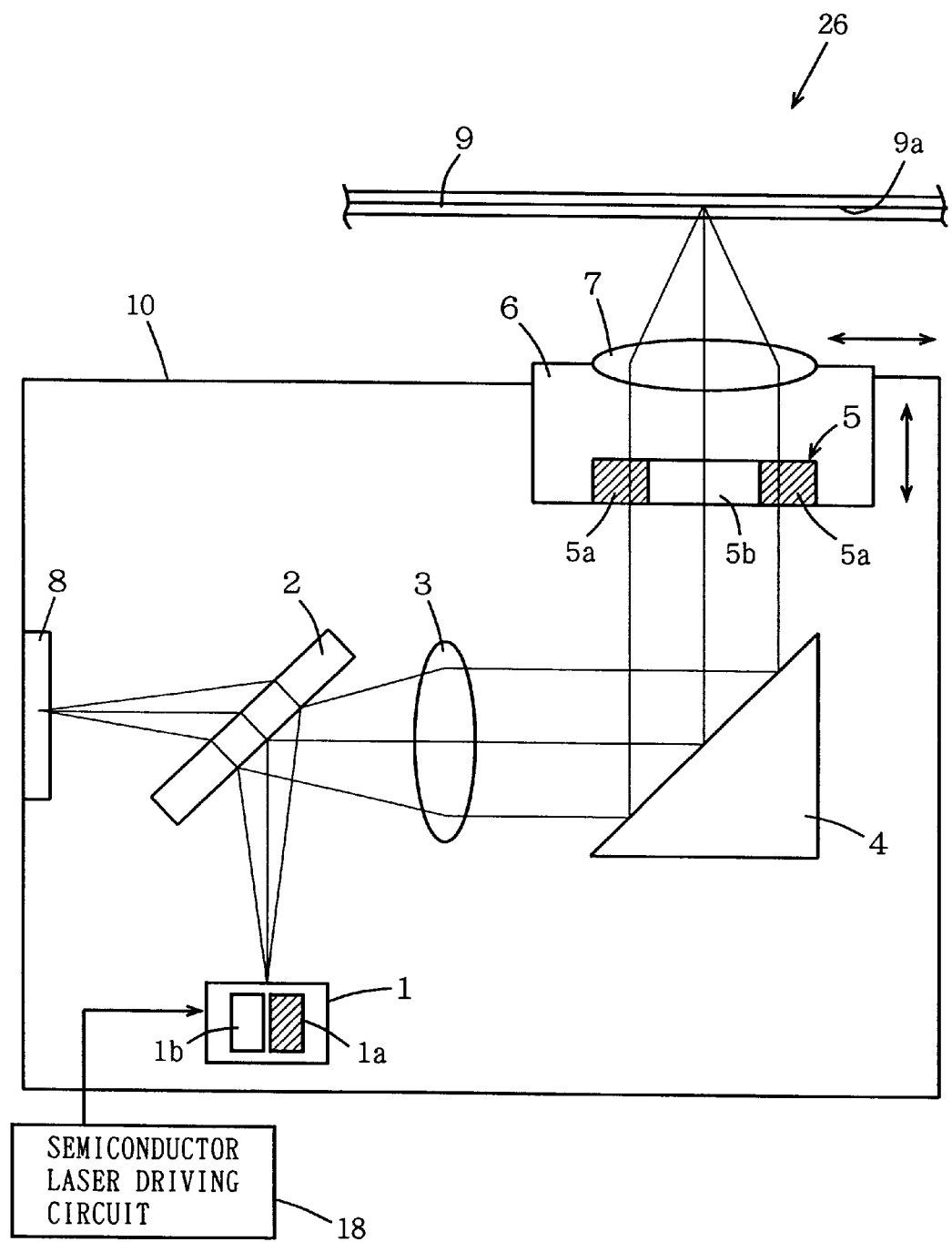
FIG. 18 is a diagram showing an optical path of the laser beam with the wavelength of 635 nm in reproducing a DVD by the optical pickup device shown in FIG. 2.

In reproducing the DVD, laser chip 1a is activated by semiconductor laser driving circuit 18 as shown in FIG. 18. Thus, half of the laser beam with the wavelength of 635 nm emitted from semiconductor laser 1 is reflected by half mirror 2, collimated by collimator lens 3, raised by mirror 4 and transmitted through optical device 5 without any diffraction. The transmitted laser beam is transmitted to and collected by objective lens 7 and focused on signal recording surface 9a through transparent substrate 9 of the DVD. A spot diameter of the laser beam on the signal recording surface is 0.9 (with tolerance of ±0.1)μm.

Figure 19:
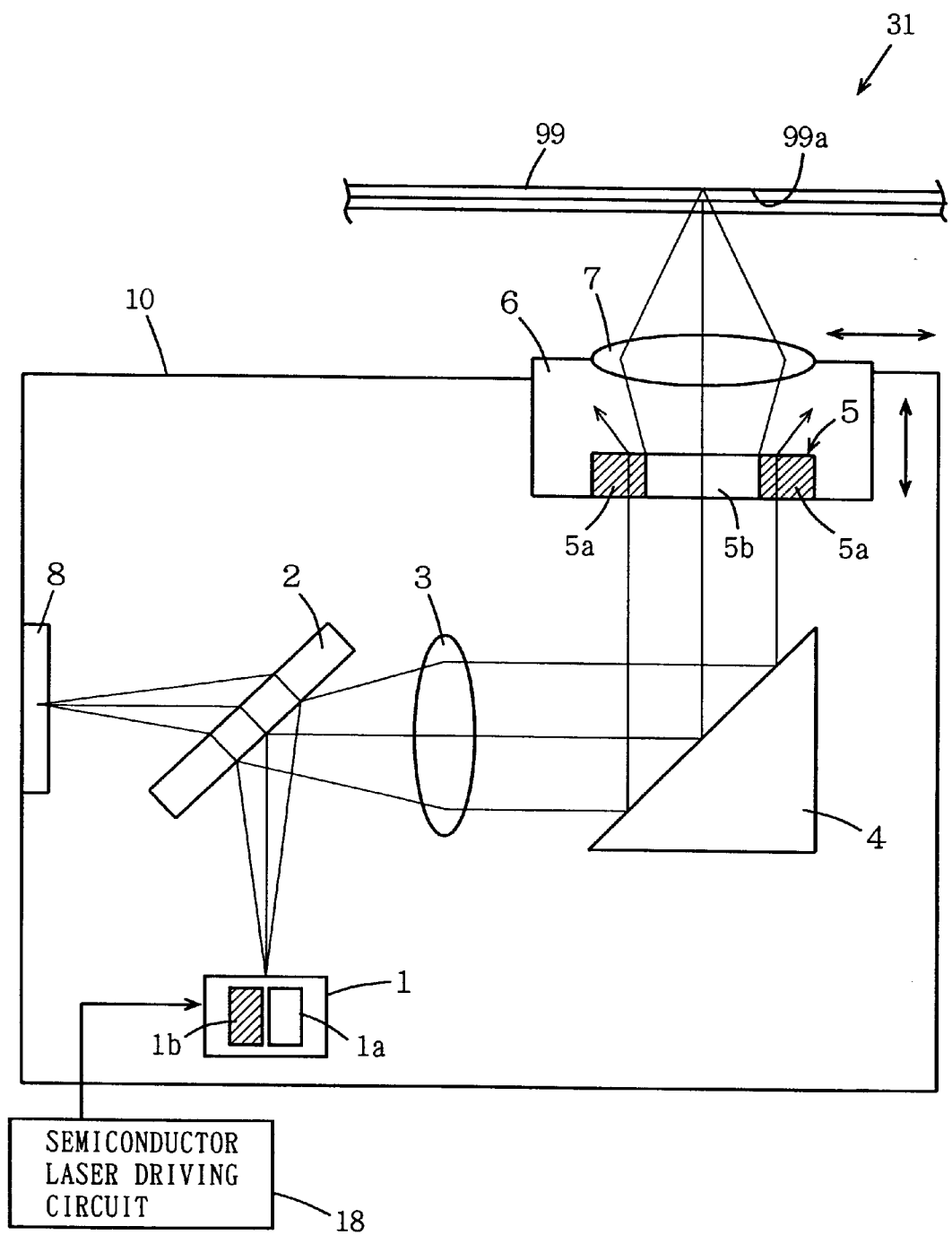
FIG. 19 is a diagram showing an optical path of the laser beam with the wavelength of 780 nm in reproducing a CD-R or a CD-ROM by the optical pickup device shown in FIG. 2.

On the other hand, in reproducing the CD-R or the CD-ROM, as shown in FIG. 19, laser chip 1b is activated by semiconductor laser driving circuit 18. Thus, half of the laser beam with the wavelength of 780 nm emitted from semiconductor laser 1 is reflected by half mirror 2, collimated by collimator lens 3, raised by rising mirror 4. Thereafter, the periphery of the laser beam is substantially shielded by optical device 5 and only central portion thereof is increased in diameter by diffraction. The laser beam transmitted through central region 5b of optical device 5 is transmitted to and collected by objective lens 7 and focused on signal recording surface 99a through transparent substrate 99 of the CD-R or CD-ROM. A spot diameter of the laser beam on signal recording surface 99a is 1.5 (with tolerance of ±0.1) μm.

As described above, according to the embodiment of the present invention, hologram 20 is formed for allowing transmission of the laser beam with the wavelength of 635 nm through the central region of optical device 5 arranged immediately below objective lens 7 without any diffraction and for increasing the diameter of the laser beam with the wavelength of 780 nm by diffraction. Further, diffraction grating 21 is formed for allowing transmission of the laser beam with the wavelength of 635 nm through peripheral region 5a of optical device 5 without any diffraction and for substantially shielding the laser beam with the wavelength of 780 nm by diffraction. Therefore, the laser beam with the wavelength of 635 nm is focused on signal recording surface 9a of the DVD by objective lens 7 and the laser beam with the wavelength of 780 nm is focused on signal recording surface 99a of the CD-R or CD-ROM 31. As a result, the optical pickup device according to the present embodiment is capable of compatibly reproducing the DVD, CD-R and CD-ROM.

In addition, the optical pickup device employs the laser beam with the wavelength of 635 nm which is the most suitable for the DVD and also employs the laser beam with the wavelength of 780 nm which is the most suitable for the CD-R or CD-ROM. Thus, the optical pickup device can suitably reproduce any of the DVD, CD-R and CD-ROM.

Further, the optical pickup device is manufactured by simply adding to the conventional optical pickup device one optical device 5 having both hologram 20 and diffraction grating 21. Therefore, the optical pickup device can be manufactured almost in the same size as that of the conventional optical pickup device.

Further, as optical device 5 is fixed to objective lens 7, accurate focusing of the laser beam on the signal recording surface can be achieved even if objective lens 7 is moved for focusing and tracking. In addition, as optical device 5 does not have any part which would be electrically or mechanically influenced, it is less susceptible to breakdown.

Modification of Optical Device

Figure 20:
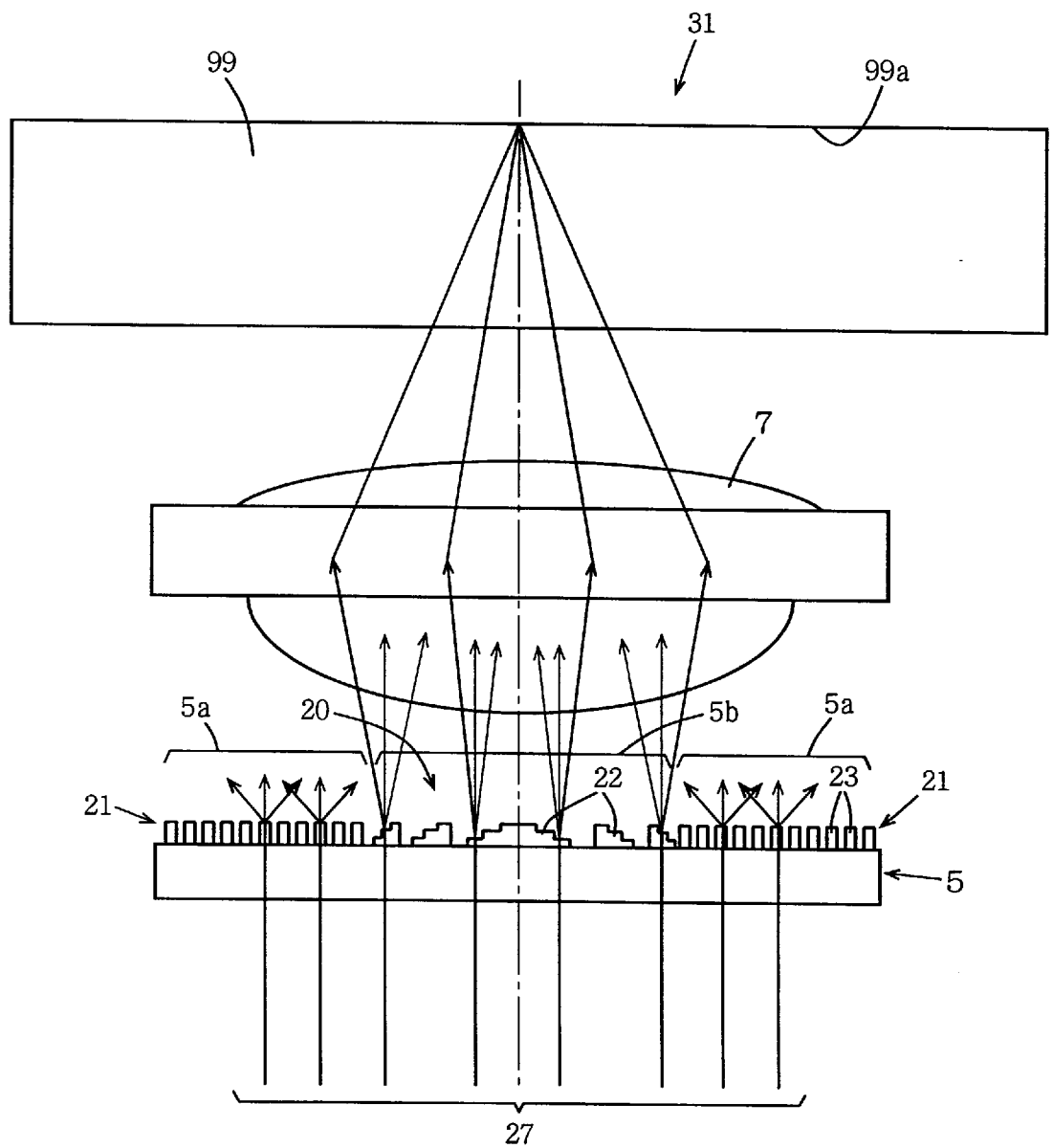
FIG. 20 is a diagram showing one modification of the optical device shown in FIG. 6.

While annular convex portion 22 of hologram 20 formed in central region 5b of the above mentioned optical device 5 has steps on the inner side as shown in FIG. 6, it may have steps on the outer side as shown in FIG. 20.

Figure 21:
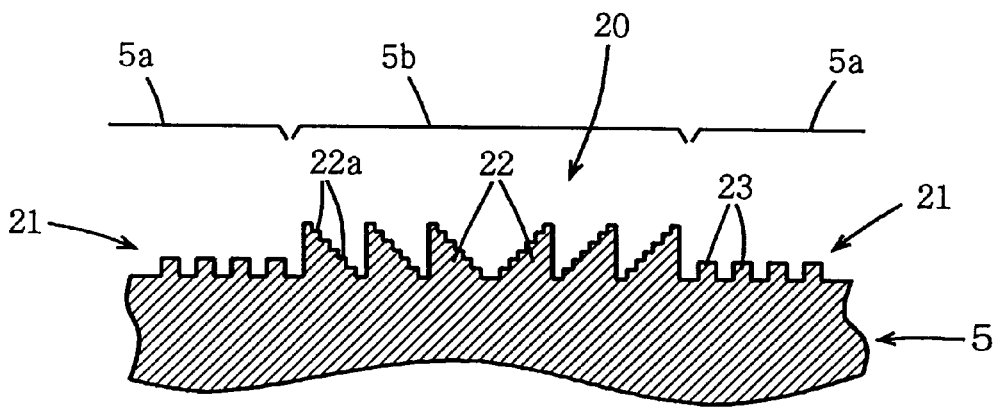
FIGS. 21 to 28 are cross sectional views showing another modifications of the optical device.
Figure 22:
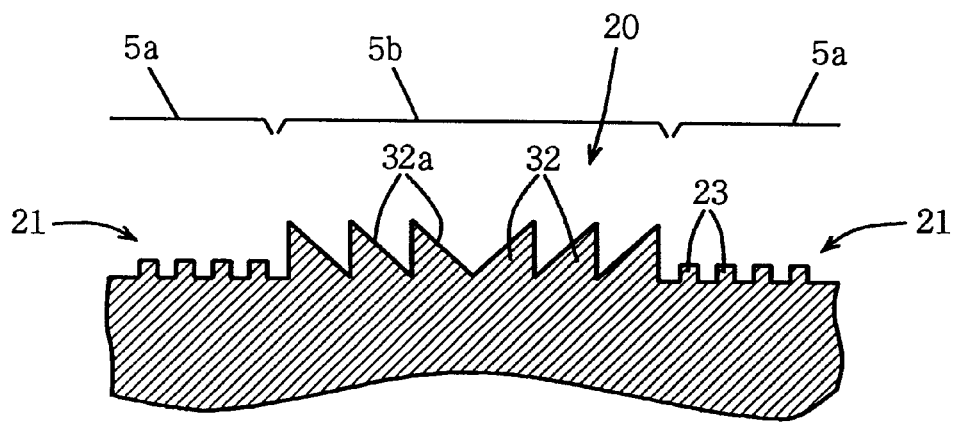

While annular convex portion 22 of the above mentioned hologram 20 has four steps 22a as shown in FIG. 6, it may have seven steps as shown in FIG. 21 and, the number of the steps is not particularly limited.

While annular convex portion 22 of hologram 20 has a plurality of steps, annular convex portion 32 having an inclined surface 32a instead of steps may be formed.

Figure 23:
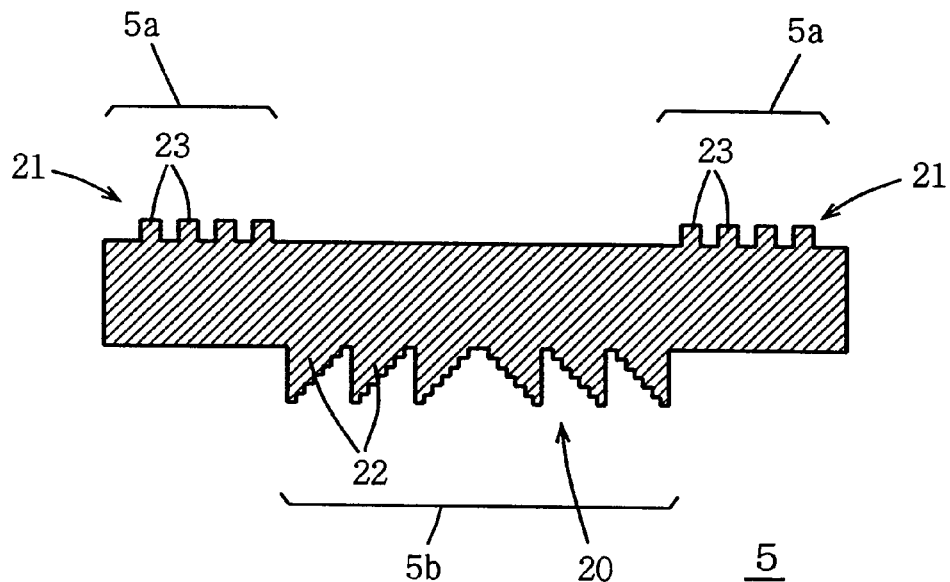
Figure 24:
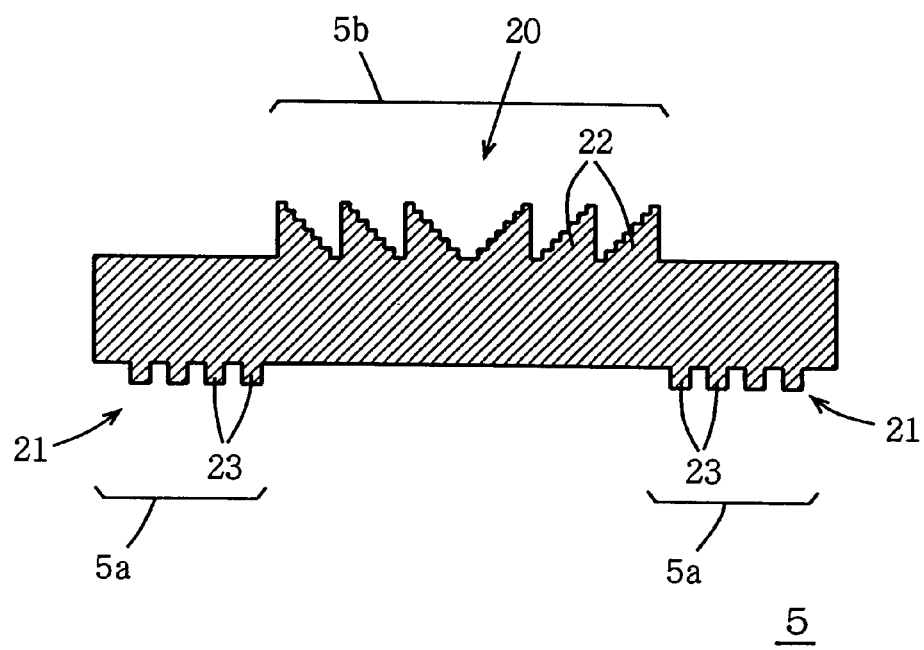

While hologram 20 and diffraction grating 21 are formed on the same surface in the above mentioned optical device 5, as shown in FIGS. 23 and 24, they may be formed on mutually opposed surfaces. In this case, the diffraction grating may be formed on the surface on the side of objective lens 7 and hologram 20 on the surface on the opposite side as shown in FIG. 23, or hologram 20 may be formed on the surface on the side of objective lens 7 and diffraction grating 21 on the surface on the opposite side as shown in FIG. 24. In the case where hologram 20 and diffraction grating 21 are formed by etching, when the heights of convex portions 22 and 23 of hologram 20 and diffraction grating 21 are different, optical device 5 can more easily be manufactured by thus forming hologram 20 and diffraction grating 21 on the different surfaces.

Figure 25:
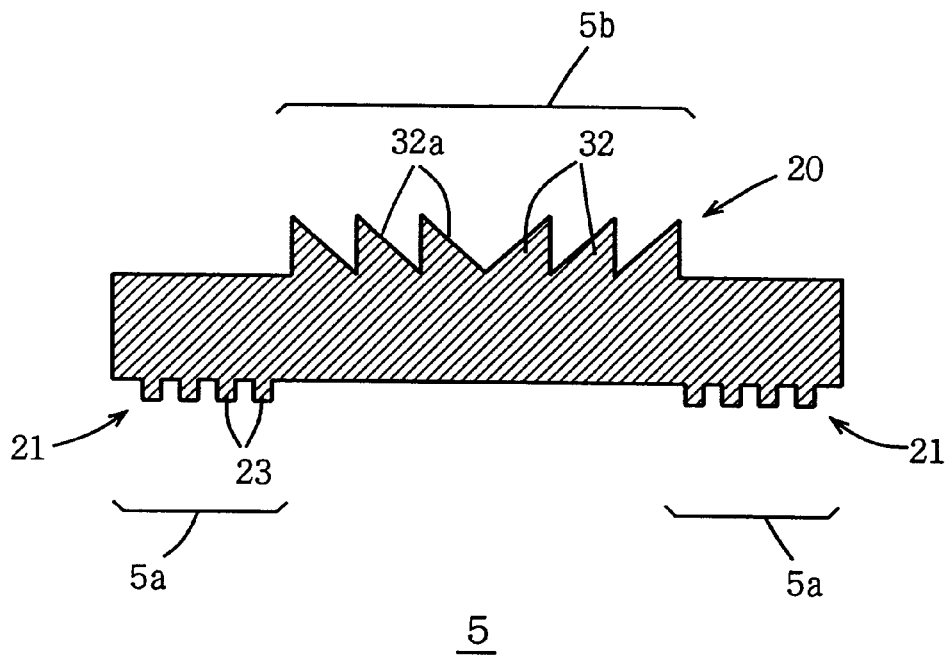
Figure 26:
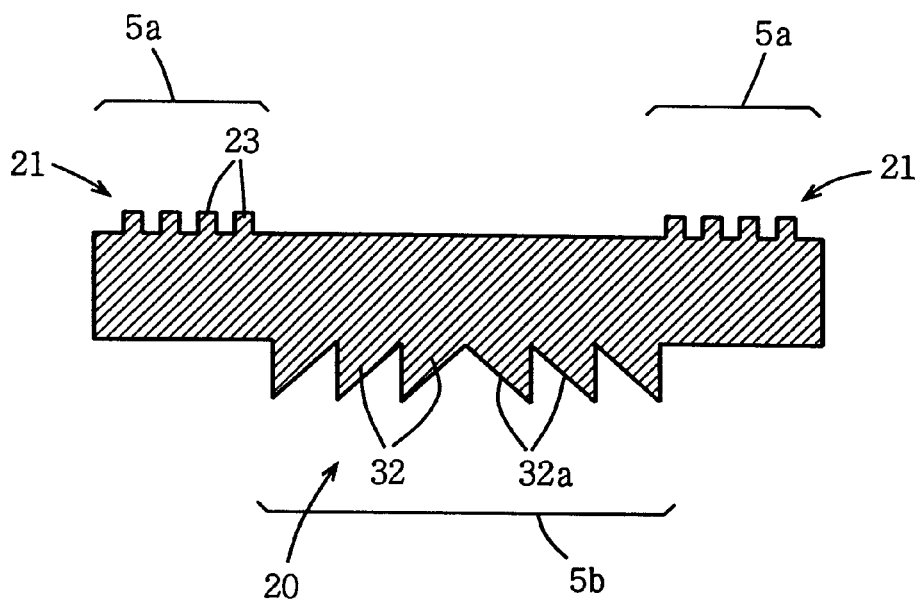

In addition, in the case of hologram 20 formed of annular convex portion 32 having inclined surface 32a, similarly, hologram 20 and diffraction grating 21 may be formed on the mutually opposed surfaces as shown in FIGS. 25 and 26.

Figure 27:
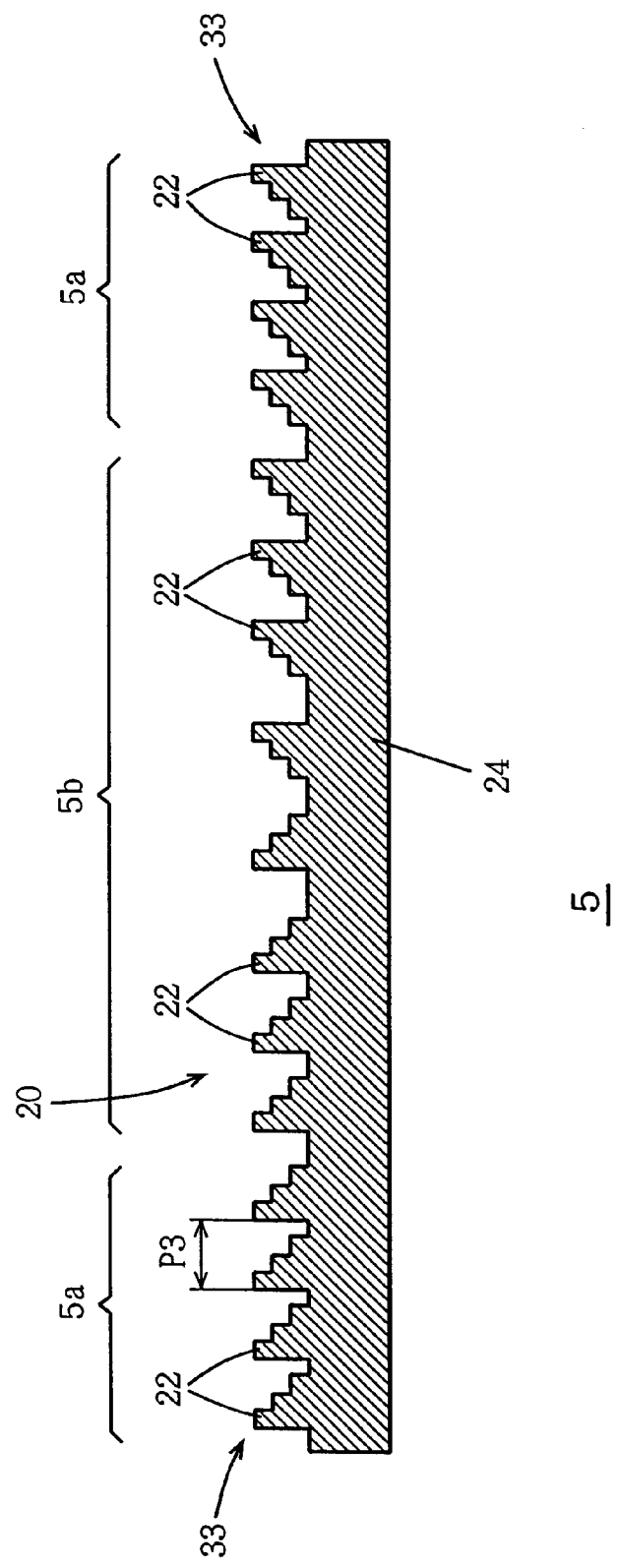

Although diffraction grating 21 is formed in peripheral region 5a in the above mentioned optical device, alternatively, hologram 33 may also be formed in peripheral region 5a as shown in FIG. 27. Annular convex portions 22 of hologram 33 in peripheral region 5a are coaxially formed in a similar manner as those of hologram 20 in central region 5b, but with prescribed pitches P3. According to optical device 5 shown in FIG. 27, hologram 33 is also formed in peripheral region 5a, so that all of the laser beam transmitted to peripheral region 5a would be outwardly diffracted and not inwardly diffracted to enter objective lens 7. As a result, noise due to the inwardly diffracted laser beam is reduced.

Figure 28:
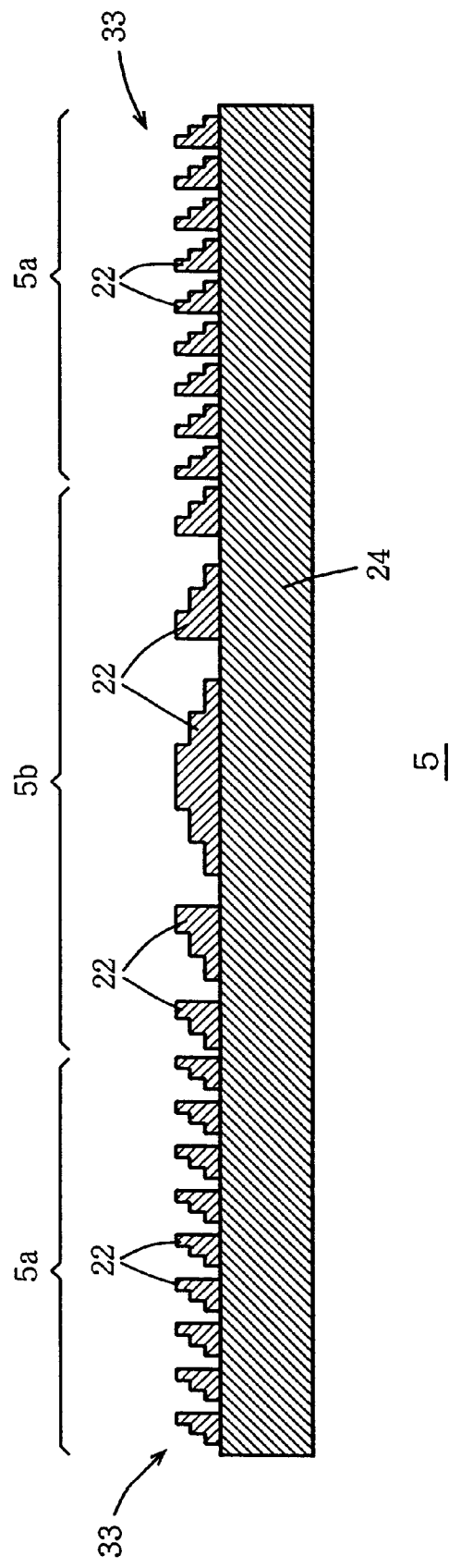

It is noted that while annular convex portion 22 shown in FIG. 27 has steps on the inner side, it may also have steps on the outer side as shown in FIG. 28.

Figure 29:
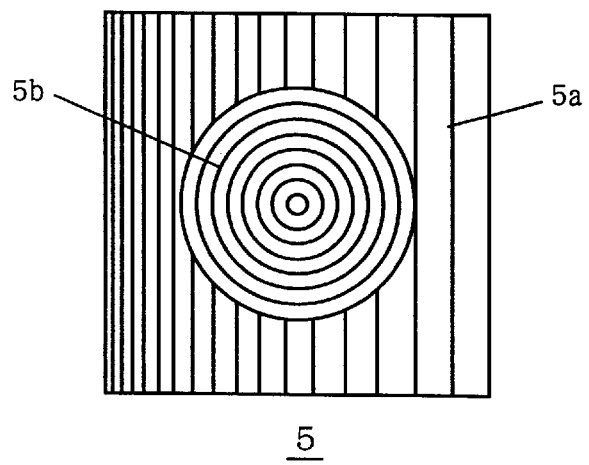
FIG. 29 is a top view showing still another modification of the optical device.
Figure 30:
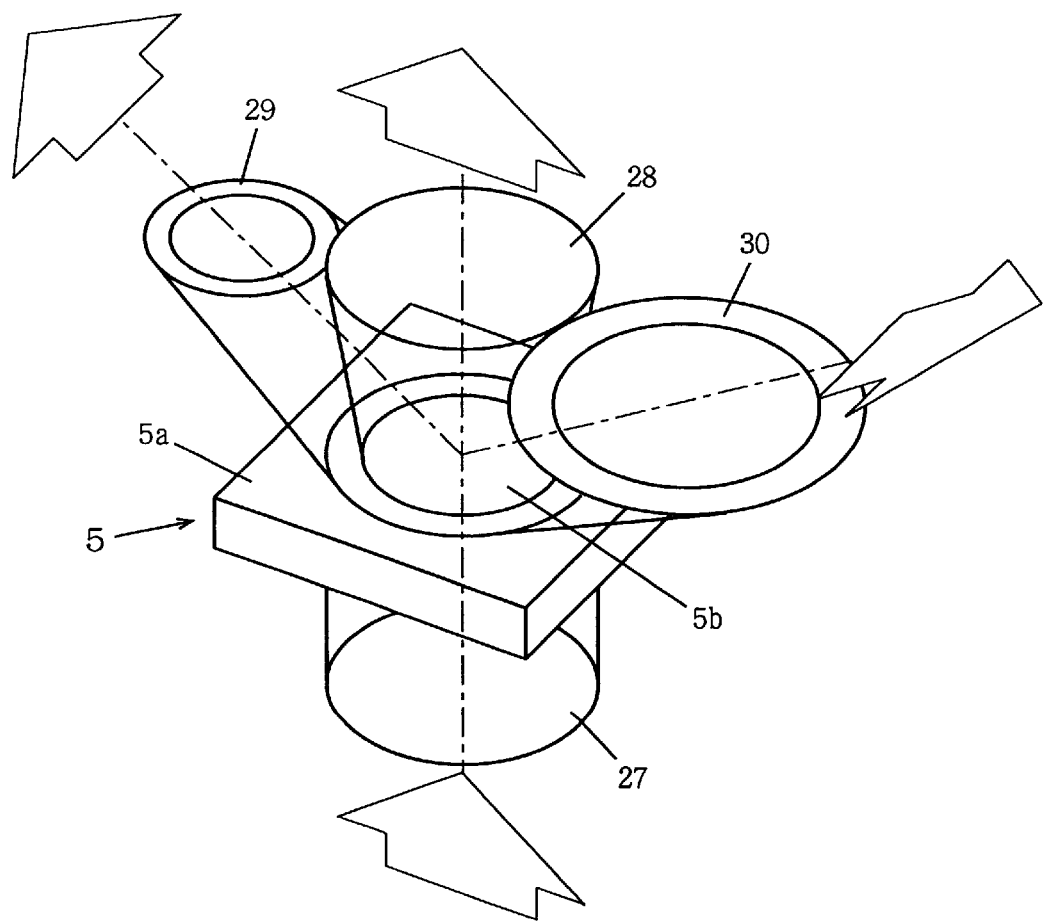
FIGS. 30 to 33 are diagrams showing optical paths when the laser beam with the wavelength of 780 nm enters the optical device shown in FIG. 29.
Figure 31:
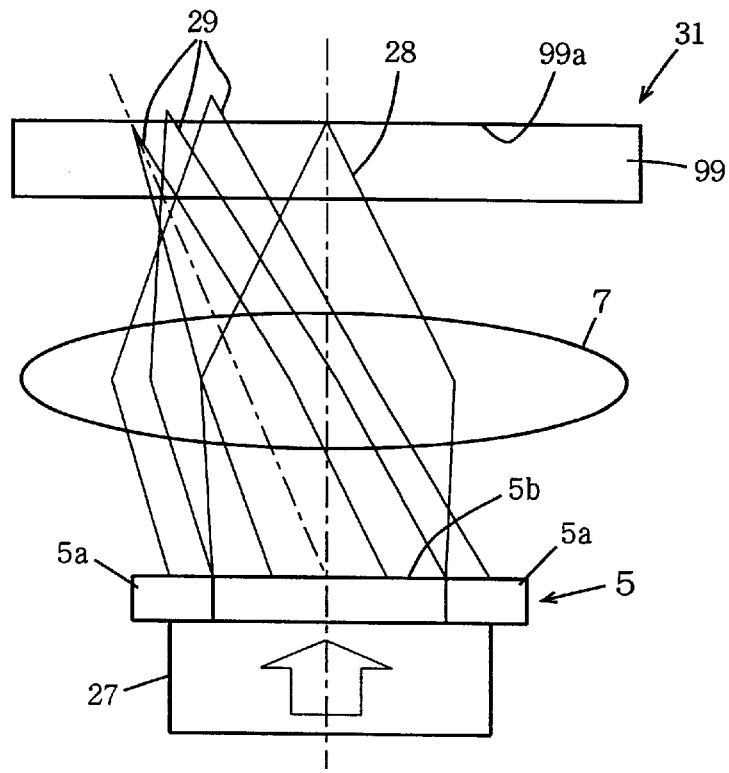
Figure 32:
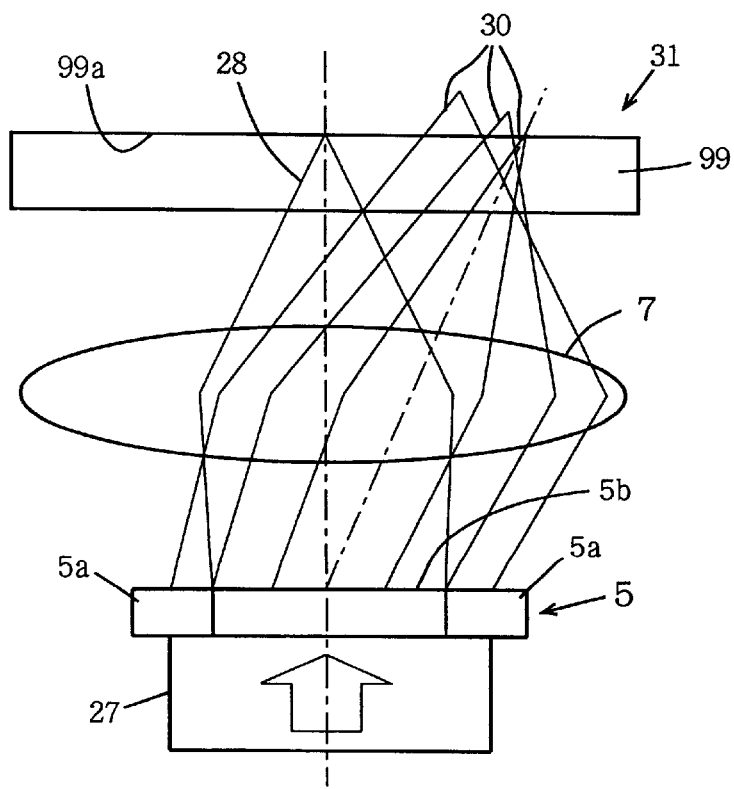
Figure 33:
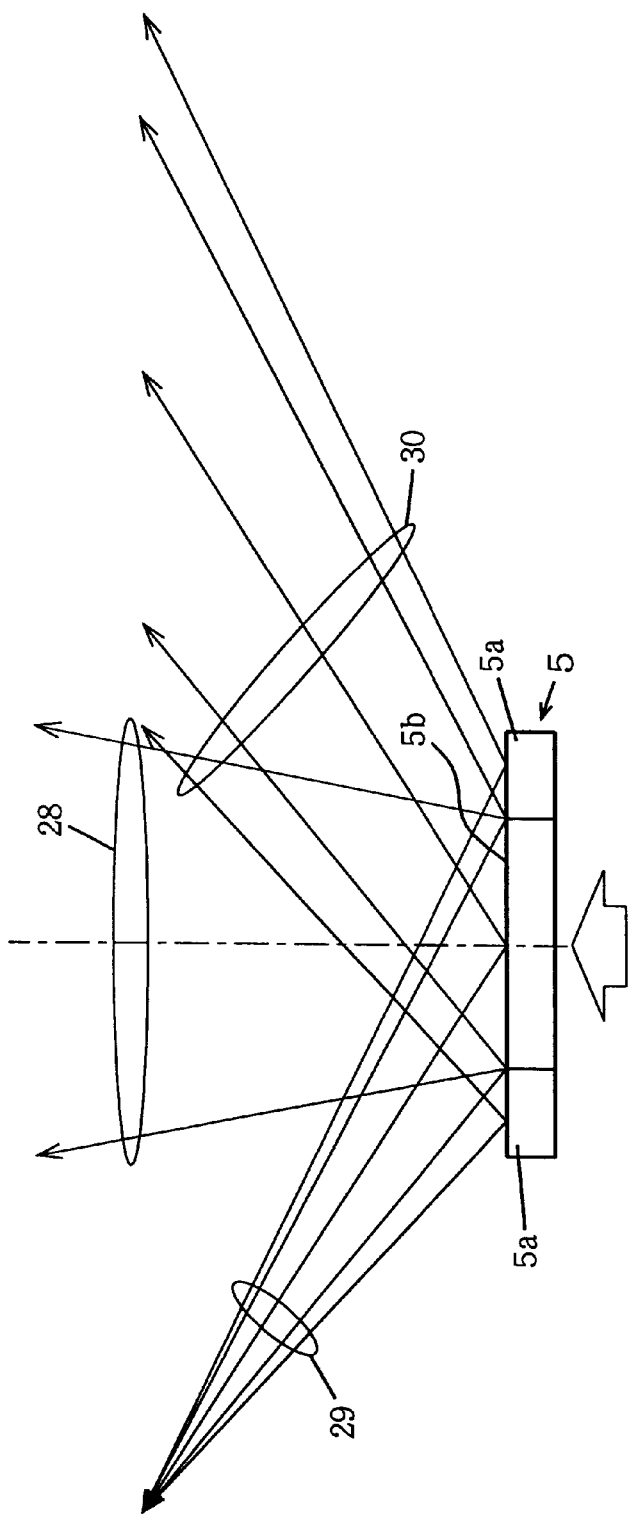

In addition, although diffraction grating 21 of optical device 5 has the same grating constants, it may have varying diffraction constants as shown in FIG. 29. More specifically, the pitches of the striped convex portions of the diffraction grating formed in peripheral region 5a of optical device 5 may gradually become narrower from the light to left side in the drawing.

Now, a diffraction function of optical device 5 will be described with reference to FIGS. 30 to 33.

When a laser beam 27 with the wavelength of 780 nm enters optical device 5, the central portion of laser beam 27 which has entered a hologram passes to a laser beam 28 which gradually increases its diameter as described above. The periphery of laser beam 27 which has entered a diffraction grating is significantly diffracted outwardly about laser beam 28. Here, +first order diffraction beam 29 on the left side travels while reducing its diameter, whereas −first order diffraction beam 30 on the light side travels while increasing its diameter.

As the diffraction grating formed in peripheral region 5a of optical device 5 has varying diffraction constants, + and − first order diffraction beams 29 and 30 do not travel back to optical device 5 through the same path as they traveled forward. Thus, noise due to diffraction beams 29 and 30 can be reduced.

Figure 34:
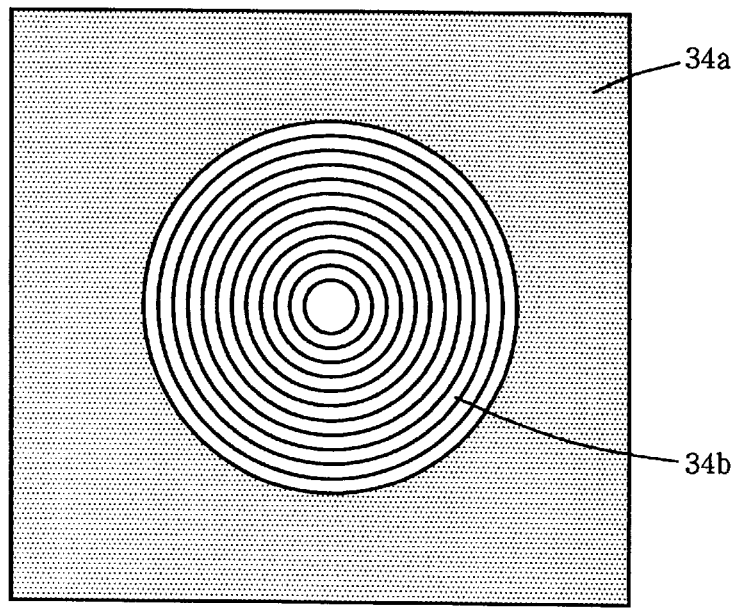
FIG. 34 is a top view showing still another modification of the optical device.
Figure 35:
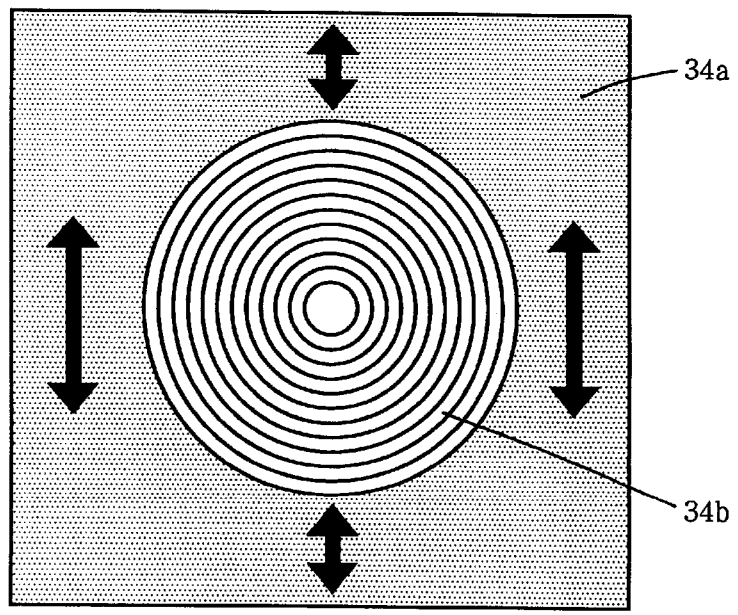
FIG. 35 is a diagram showing a polarizing direction of a polarizing filter formed in the peripheral region shown in FIG. 34.

In addition, peripheral region 5a of optical device 5 needs only substantially shield the laser beam with the wavelength of 780 nm and a polarizing filter may be formed in peripheral region 34a of optical device 34 as shown in FIG. 34. A hologram is formed in central region 34b of optical device 34 in a similar manner as described above. The polarizing filter formed in peripheral region 34a has a polarization direction in a longitudinal direction of the drawing as shown in FIG. 35. Thus, peripheral region 34a allows transmission of the laser beam polarized in the longitudinal direction of the drawing without any diffraction, but shields the laser beam polarized in a transverse direction in the drawing by reflectance. In the optical pickup device having such optical device 34, semiconductor laser 1 must polarize the laser beam with the wavelength of 635 nm in the longitudinal direction of the drawing and the laser beam with the wavelength of 780 nm in the transverse direction in the drawing. Thus, while all of the laser beam with the wavelength of 635 nm is transmitted through optical device 34, the periphery of the laser beam with the wavelength of 780 nm is shielded by peripheral region 34a and only central portion thereof is diffracted by the hologram and reaches objective lens 7 while increasing its diameter.

Figure 36:
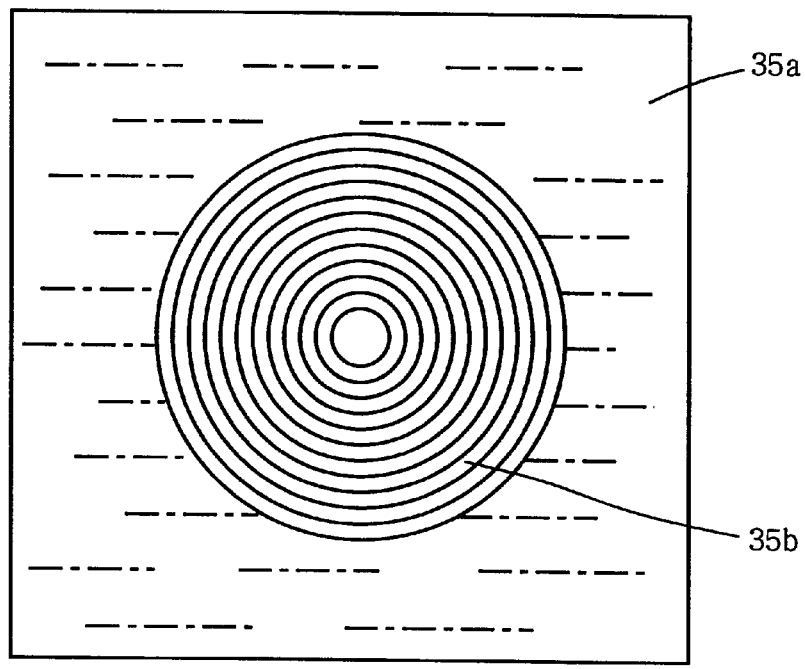
FIG. 36 is a top view showing still another modification of the optical device.
Figure 37:
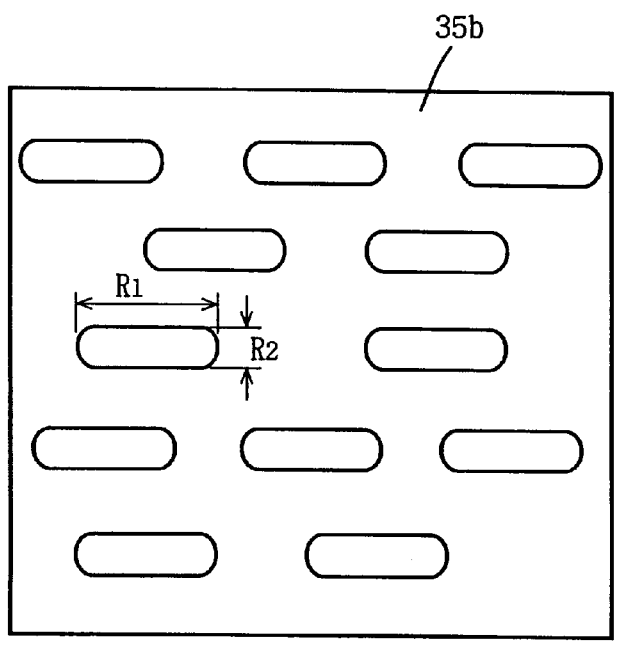
FIG. 37 is a diagram partially showing in enlargement a polarizing glass in the peripheral region of the optical device shown in FIG. 36.

As shown in FIG. 36, a polarizing glass may be formed in peripheral region 35a of optical device 35. A hologram is formed in central region 35b of optical device 35 as in the case described above. The polarizing glass is obtained by burning a glass surface on which silver atoms are applied in elongate shapes as shown in FIG. 37 for absorption of the laser beam with the wavelength of 780 nm. An aspect ratio R1/R2 of the applied silver atoms is between 1 and 5. In optical device 35, aspect ratio R1/R2 is set to absorb only the laser beam with the wavelength of 780 nm. Accordingly, when such optical device 35 is employed, all of the laser beam with the wavelength of 635 nm is transmitted through optical device 35, whereas the periphery of the laser beam with the wavelength of 780 nm is shielded by the polarizing glass and the central portion thereof is diffracted to reach objective lens 7 while increasing its diameter.

It is noted that as the glass needs only shield the laser beam with the wavelength of 780 nm by absorption, a colored glass for absorbing the laser beam with the wavelength of 780 nm may be employed in place of the polarizing glass.

Further, although the central region of the optical device selectively causes a diffraction phenomenon in accordance with the wavelength of the laser beam, the present invention is not limited to this and the central region of the optical device may selectively cause diffraction phenomenon in accordance with a plane of polarization of the laser beam. More specifically, the central region of the optical device may diffract only laser beam polarized in the transverse direction in the drawing and not the laser beam polarized in the longitudinal direction in the drawing.

Modification of Semiconductor Laser

Figure 38:
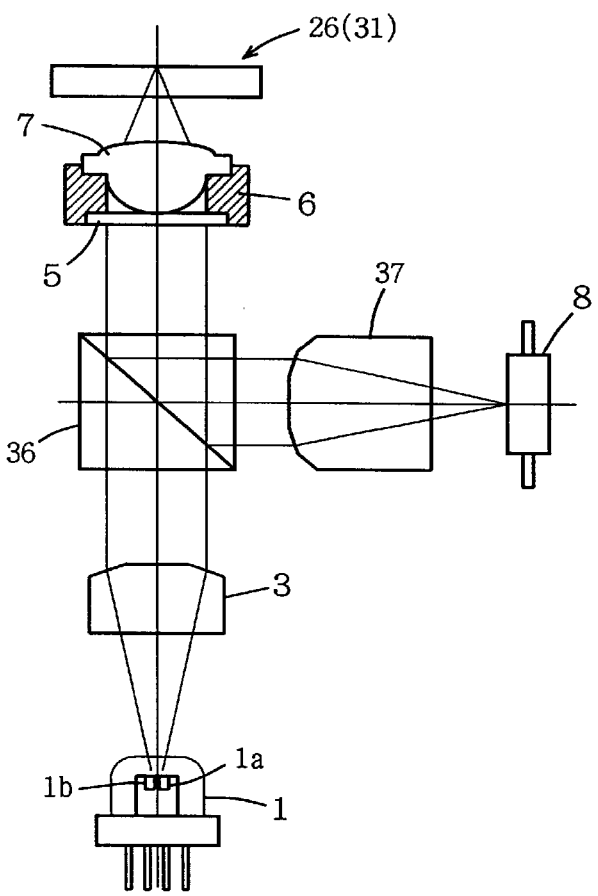
FIG. 38 is a diagram showing an optical system of the optical pickup device according to an embodiment of the present invention.
Figure 39:
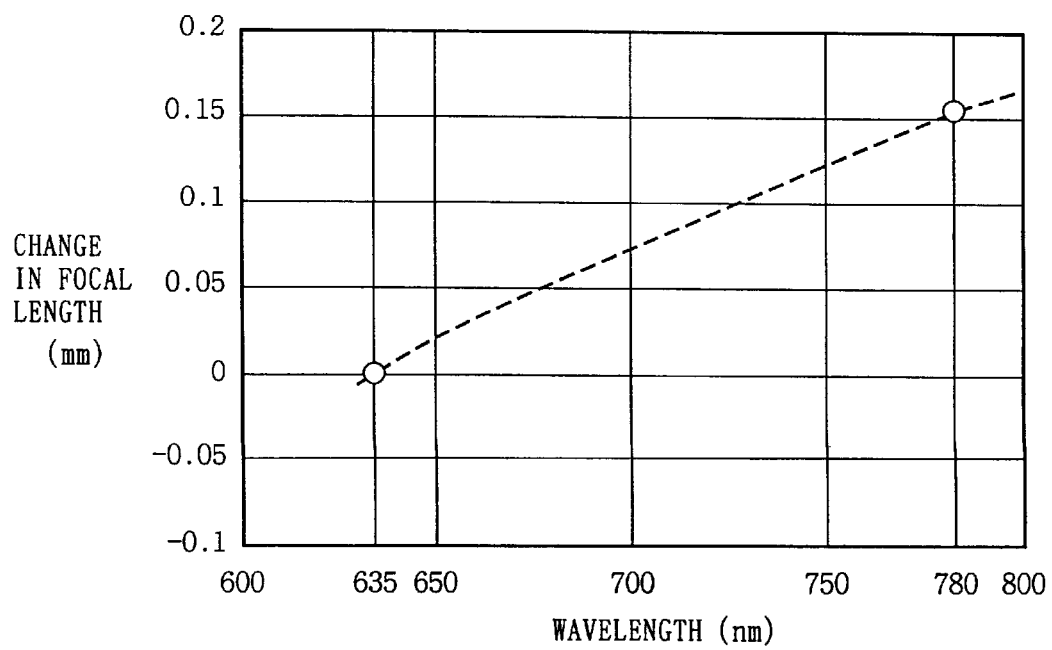
FIG. 39 is a diagram showing a relation between a focal length and a wavelength of a collimator lens shown in FIG. 38.

When laser chips 1a and 1b are arranged on the same plane perpendicular to an optical axis as shown in FIG. 38, a focal length for collimator lens 3 including a single material varies in accordance with the wavelength of the laser beam. More specifically, the focal length of collimator lens 3 for the wavelength of 780 nm is longer by 0.15 mm than that for the wavelength of 635 nm. Such variation in focal distances way cause chromatic aberration.

Figure 40A:
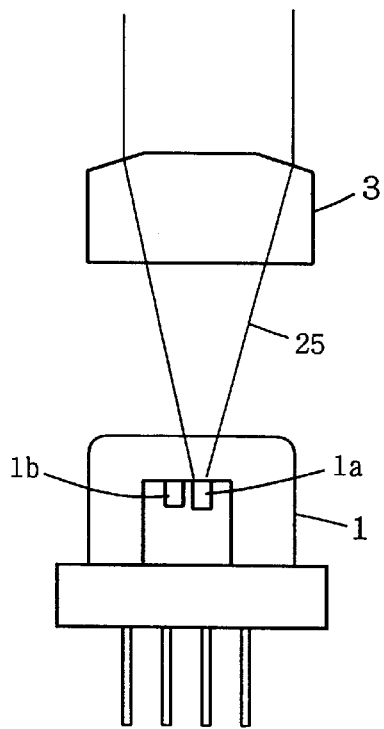
FIG. 40A is a diagram showing an optical path when the laser beam with the wavelength of 635 nm enters the collimator lens.
Figure 40B:
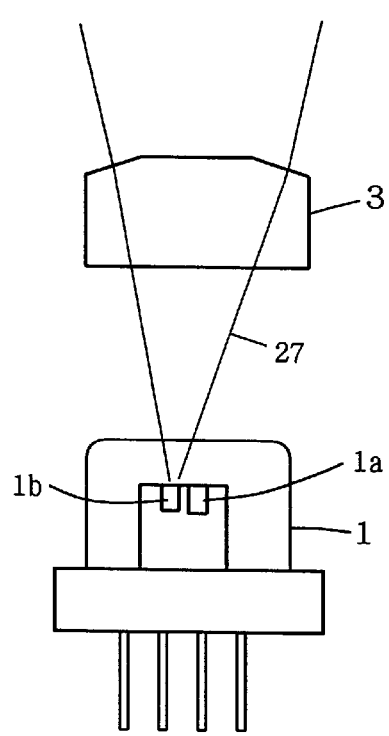
FIG. 40B is a diagram showing an optical path when the laser beam with the wavelength of 780 nm enters the collimator lens.

When laser chips 1a and 1b are arranged on a focal point of collimator lens 3 for the laser beam with the wavelength of 635 nm, for example, a laser beam 25 with the wavelength of 635 nm emitted from laser chip 1a is transmitted through and collimated by collimator lens 3 as shown in FIG. 40A. However, a laser beam 27 with the wavelength of 780 nm emitted from laser chip 1b is not collimated even after it is transmitted through collimator lens 3 as shown in FIG. 40B. Thus, laser beam 27 with the wavelength of 780 nm is not accurately focused on the signal recording surface of the CD-R or CD-ROM by objective lens 7, whereby chromatic aberration is caused.

Figure 41A:
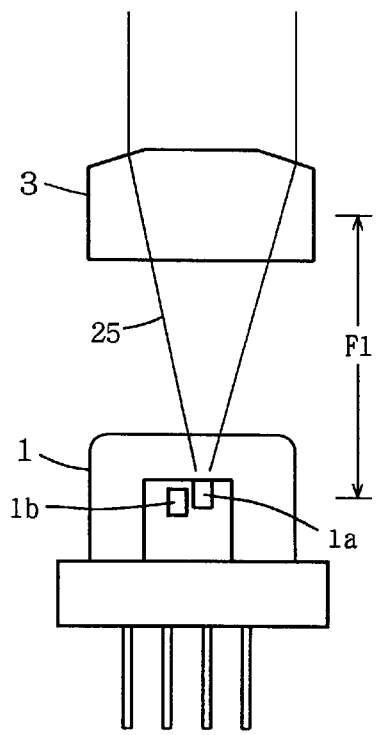
FIG. 41A is a diagram showing a modification of the semiconductor laser with an optical path when the laser beam with the wavelength of 635 nm enters the collimator lens.
Figure 41B:
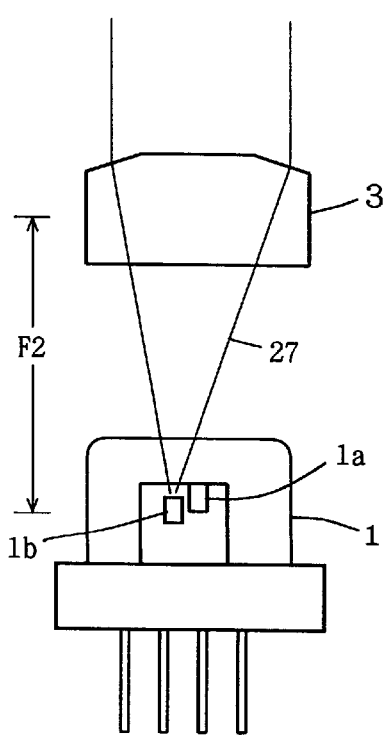
FIG. 41B is a diagram showing an optical path when the laser beam with the wavelength of 780 nm enters the collimator lens from the semiconductor laser shown in FIG. 41A.

Then, to avoid such chromatic aberration, preferably, laser chip 1a is spaced by a first focal length F1 from the collimator lens such that laser beam 25 with the wavelength of 635 nm is transmitted through and collimated by collimator lens 3, and laser chip 1b is spaced by a second focal length F2 which is longer than first focal length F1 by 0.15 mm from collimator lens 3 such that the laser beam with the wavelength of 780 nm is transmitted through and collimated by collimator lens 3 as shown in FIG. 41B.

It is noted that, in FIG. 38, a beam splitter 36 is arranged between optical device 5 and collimator lens 3 in place of half mirror 2. Thus, a collecting lens 37 is arranged between beam splitter 36 and photodetector 8 for collecting the laser beam from beam splitter 36 to photodetector 8.

Figure 42:
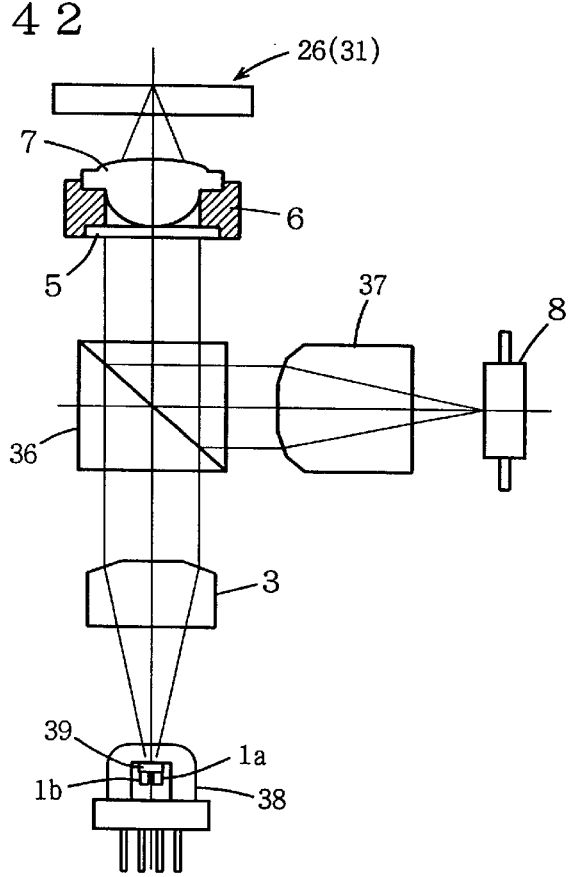
FIG. 42 is a diagram showing a modification of the semiconductor laser with an optical system of the optical pickup device.
Figure 43:
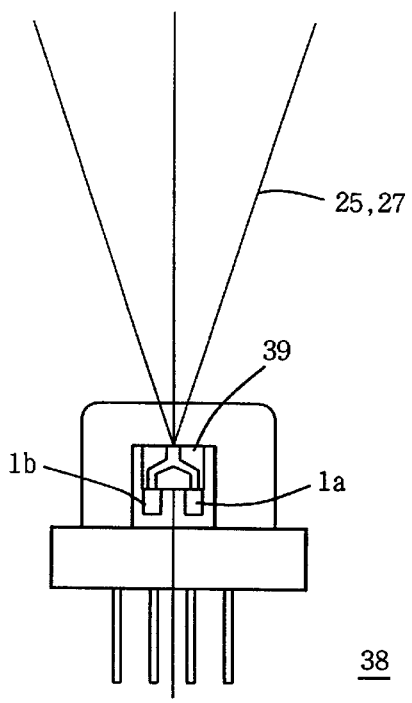
FIG. 43 is a diagram showing a structure of the semiconductor laser shown in FIG. 42.

Further, to avoid displacement of optical axes, only one emittance opening may be provided for the laser beams with wavelengths of 635 nm and 780 nm. As shown in FIG. 42, for example, semiconductor laser 31 has an optical waveguide 39 for combining the laser beams with the wavelengths of 635 nm and 780 nm. Optical waveguide 39 is in a shape of Y as shown in FIG. 43, and includes two incident openings facing the emittance openings of laser chips 1a and 1b respectively, and an emittance opening communicating with these two incident openings. According to such semiconductor laser 38, luminous points of the laser beams with the wavelengths of 635 nm and 780 nm are substantially the same, so that displacement of optical axes is prevented.

Figure 44A:
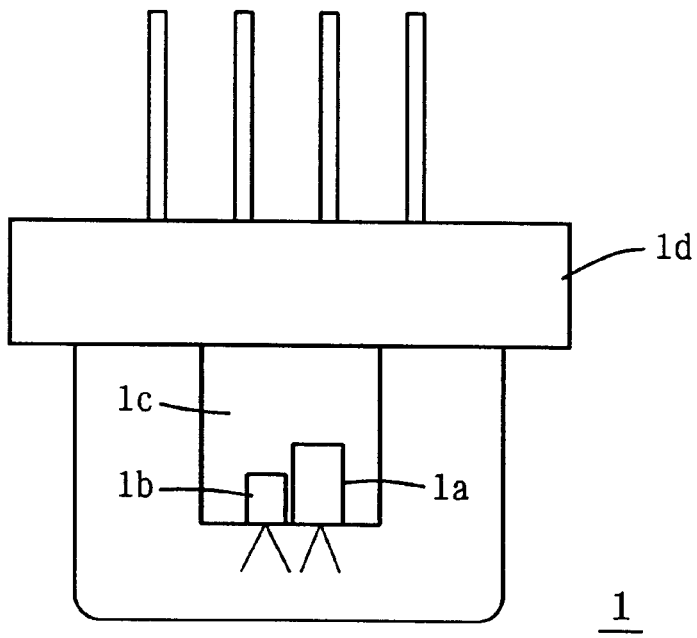
FIG. 44A is a side view showing a modification of the semiconductor laser.
Figure 44B:
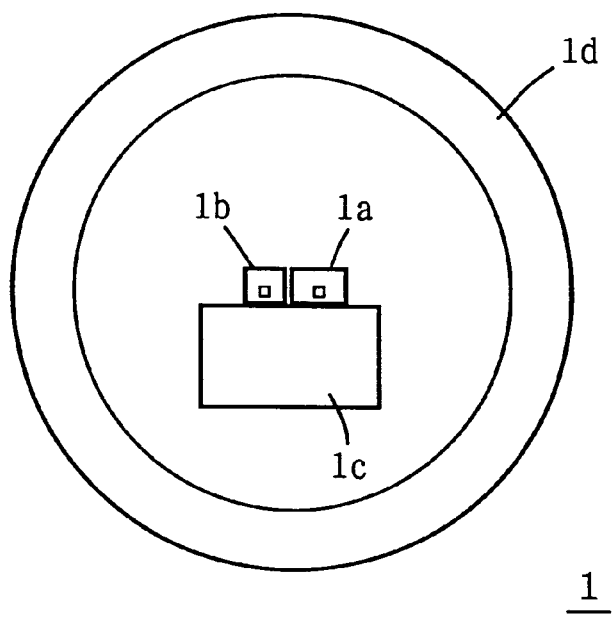
FIG. 44B is a top view of the semiconductor laser shown in FIG. 44A.
Figure 45:
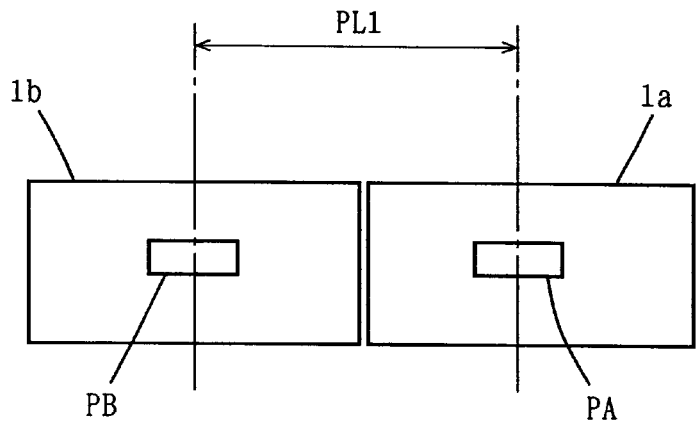
FIG. 45 is a diagram showing an arrangement of two laser chips in the semiconductor laser.

While laser chips 1a and 1b are mounted to base 1c adjacent to each other as shown in FIGS. 44A and 44B, a prescribed distance PL1 is provided between their emission points PA and PB as shown in FIG. 45. Distance PL1 corresponds to a width of laser chips 1a and 1b, which is generally between 300 μm and 350 μm. As displacement of emittance openings PA and PB may cause aberration, distance PL1 is preferably made as small as possible.

Figure 46:
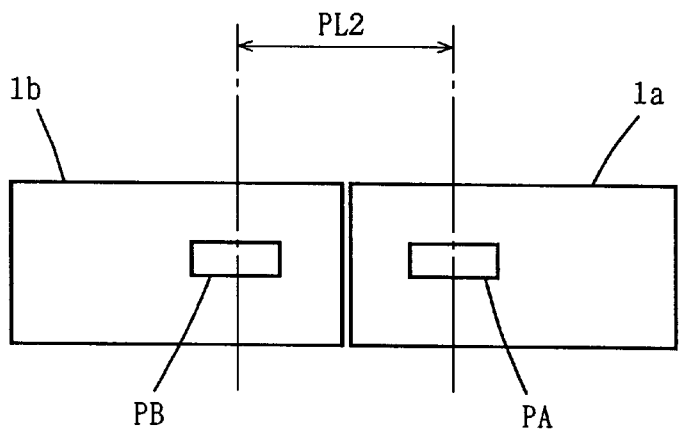
FIG. 46 is a diagram showing a modification of the two laser chips in the semiconductor laser.
Figure 47:
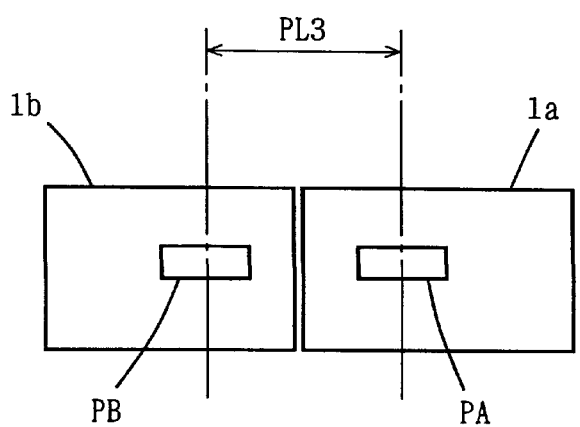
FIG. 47 is a diagram showing another modification of the two laser chips in the semiconductor laser.

Then, as shown in FIG. 46, emission points PA and PB are preferably formed offset from the centers of laser chips 1a and 1b to reduce distance PL2 therebetween. Alternatively, as shown in FIG. 47, after emission points PA and PB are formed in the centers of laser chips 1a and 1b, a distance PL3 between emission points PA and PB may be reduced by cutting the side ends of laser chips 1a and 1b which are adjacent to each other.

As described above, laser chips 1a and 1b are arranged with their one sides adjacent to each other, and the distances between emission points PA and PB and one sides thereof are shorter than those between emission points PA and PB and the other sides opposite to the one sides, respectively.

Figure 48:
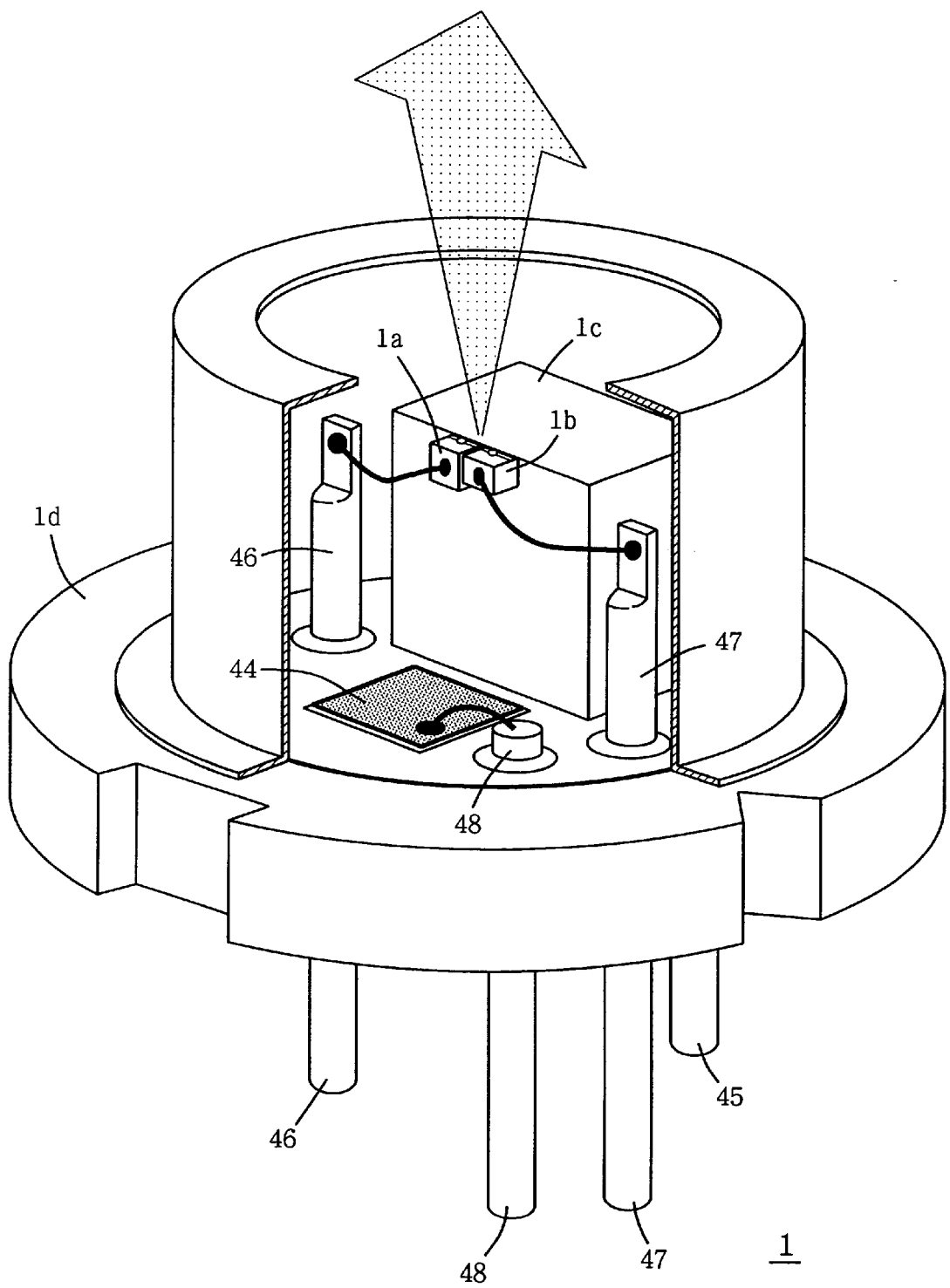
FIG. 48 is a partially cutaway perspective view showing still another modification of the semiconductor laser.

Further, semiconductor laser 1 must be provided with a photodetector for monitoring the laser beam emitted therefrom. When two laser chips 1a and 1b are provided as described above, two photodetectors may be provided corresponding to laser chips 1a and 1b. However, as shown in FIG. 48, a single photodetector 44 is preferably provided for monitoring laser beams with the wavelengths of 635 nm and 780 nm leaking from the backsides of laser chips 1a and 1b.

Figure 49A:
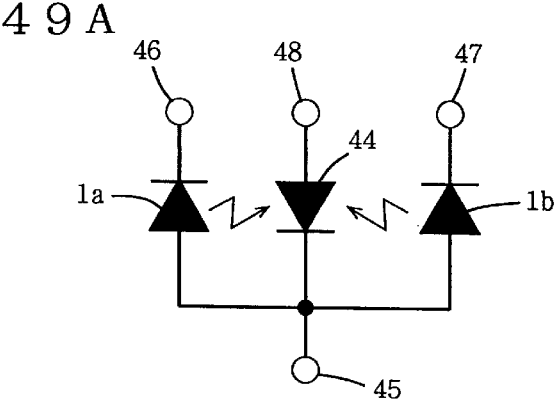
FIG. 49A is a circuit diagram of the semiconductor laser shown in FIG. 48, and FIGS. 49B to 49D are another circuit diagrams.

Semiconductor laser 1 has four terminals 45 to 48. As shown in FIG. 49A, terminal 45 is connected to anode electrodes of laser chips 1a and 1b and a cathode electrode of photodetector 44. Terminal 46 is connected to a cathode electrode of laser chip 1a. Terminal 47 is connected to a cathode electrode of laser chip 1b. Terminal 48 is connected to an anode electrode of photodetector 44. As terminal 45 is connected to one electrodes of laser chips 1a and 1b and photodetector 44, the number of terminals for semiconductor laser 1 is reduced.

Figure 49B:
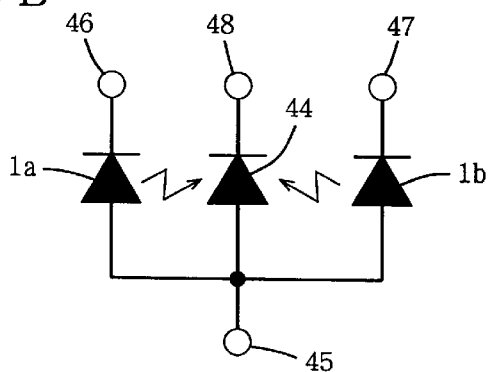

As shown in FIG. 49B, terminals 45 and 48 may also be connected to the anode and cathode electrodes of photodetector 44, respectively.

Figure 49C:
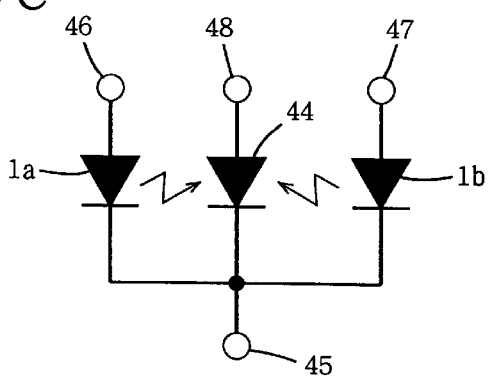

Alternatively, as shown in FIG. 49C, terminal 45 is connected to cathode electrodes of laser chips 1a and 1b and photodetector 44, terminal 46 to the anode electrode of laser chip 1a, terminal 47 to the anode electrode of laser chip 1b and terminal 48 to the anode electrode of photodetector 44.

Figure 49D:
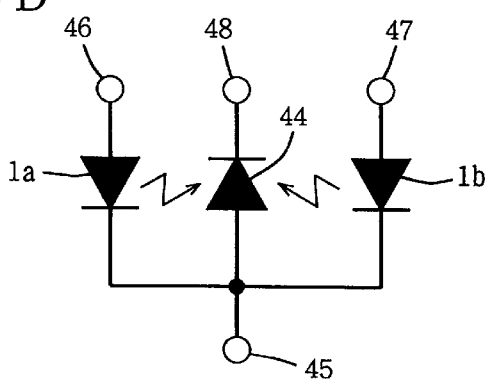

Alternatively, as shown in FIG. 49D, terminal 45 may be connected to the cathode electrodes of laser chips 1a and 1b and the anode electrode of photodetector 44, terminal 46 to the anode electrode of laser chip 1a, terminal 47 to the anode electrode of laser chip 1b and terminal 48 to the cathode electrode of photodetector 44.

Arrangement of Optical System

Figure 50:
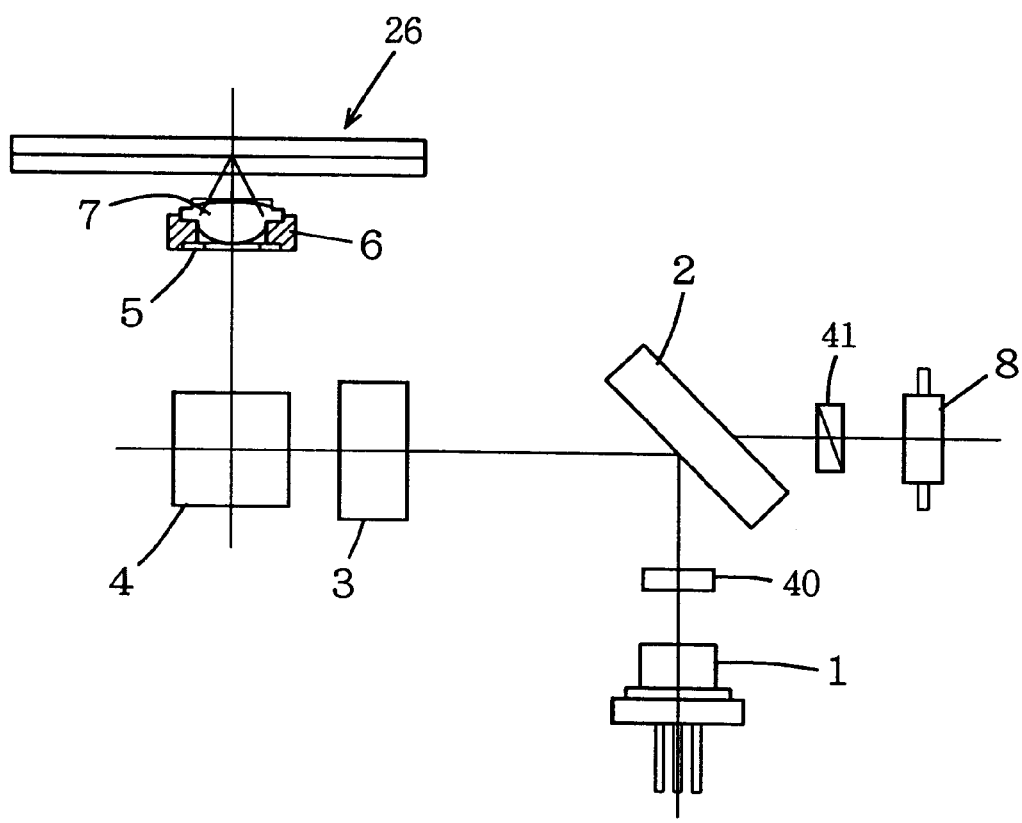
FIG. 50 is a diagram showing the optical system of the optical pickup device in accordance with an embodiment of the present invention.

FIG. 50 is a top view showing only an optical system of the above described optical pickup device. It is noted that, in FIG. 50, a diffraction grating 40 for a three-beam method is arranged between semiconductor laser 1 and half mirror 2. In addition, a Wollaston prism 41 for collecting the laser beam with the wavelength of 635 nm or 780 nm in a prescribed position on photodetector 8 is arranged between half mirror 2 and photodetector 8.

While objective lens 7 and optical device 5 are shown on the upper side of mirror 4 in FIG. 50, they are arranged immediately above mirror 4. In other words, an optical axis of objective lens 7 is perpendicular to, not parallel to, an optical axis of semiconductor laser 1.

Figure 51A:
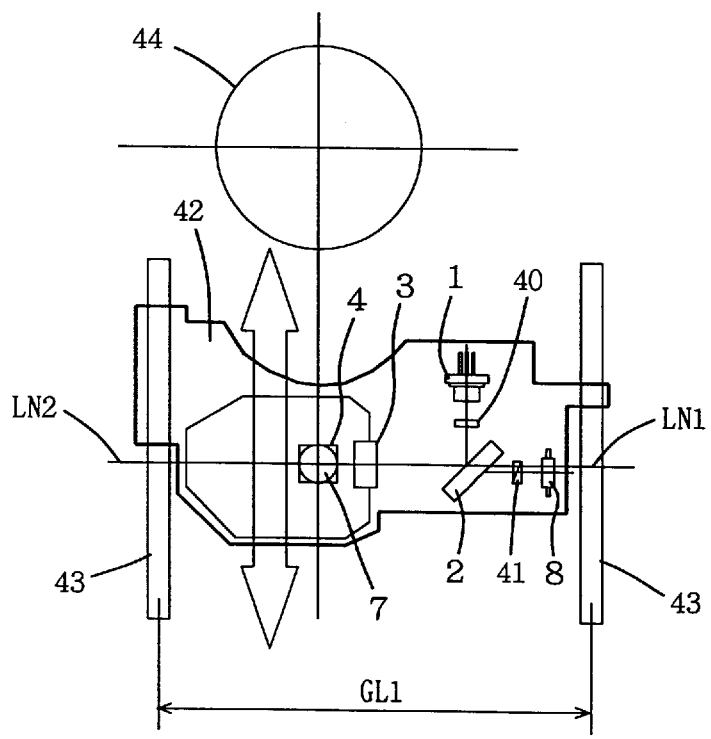
FIG. 51A is a top view of the optical pickup device.

The optical system shown in FIG. 50 is accommodated in body 42 as shown in FIG. 51A. Such body 42 is supported between two guide shafts 43. As guide shafts 43 are provided in a radial direction of the optical disk, the optical pickup device including such optical system and body 42 can move in the radial direction of the optical disk along guide shafts 43. Thus, objective lens 7 can be moved in a direction toward or away from a driving axis (a center of the optical disk) of a spindle motor 44.

In the optical pickup device shown in FIG. 51A, an optical axis LN1 of the laser beam entering mirror 4 is aligned with a perpendicular LN2 with respect to two guide shafts 43, so that a relatively long distance GL1 is ensured between guide shafts 43.

Therefore, the optical system is desirably arranged such that optical axis LN1 of the laser beam entering mirror 4 is angled with respect to perpendicular LN2 for two guide shafts 43 to form an acute angle θ (of for example between 30° and 45°). With such arrangement, a distance GL2, which is narrower than the above mentioned distance GL1, is ensured between guide shafts 43.

Figure 51B:
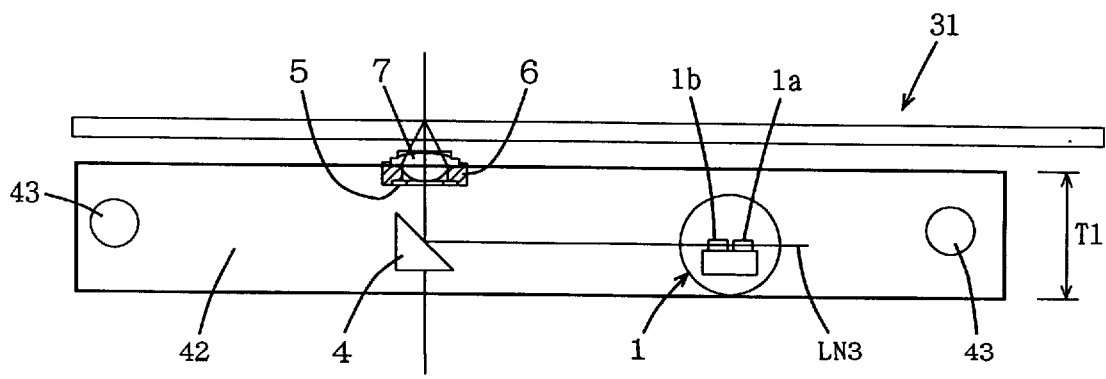
FIG. 51B is a cross sectional view showing the optical pickup device in FIG. 51A.

In the case of the arrangement shown in FIG. 51A, if semiconductor laser 1 is arranged such that a line LN3 passing through the emittance openings of laser chips 1a and 1b is parallel to a main surface of the optical disk as shown in FIG. 51B, the laser beams with the wavelengths of 635 nm and 780 nm from laser chips 1a and 1b can form beam spots symmetrically on either side of the track of the optical disk, respectively.

Figure 52A:
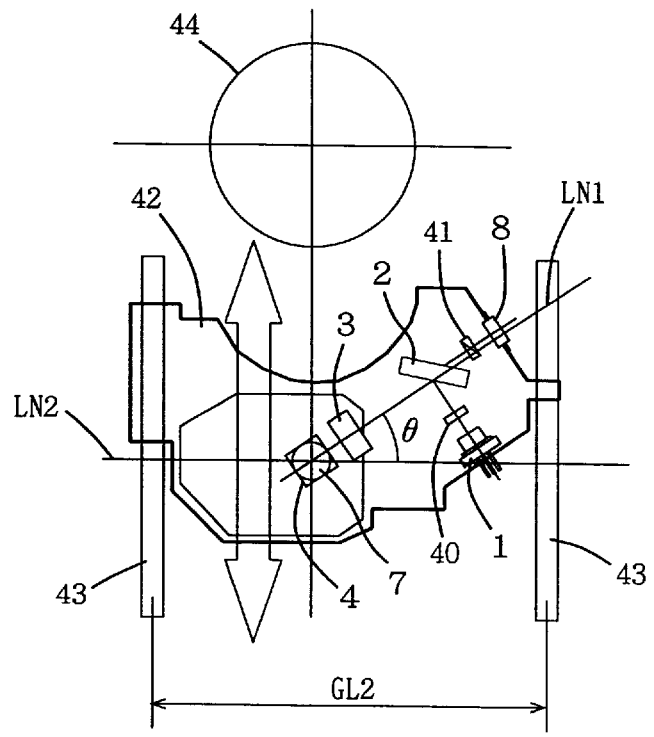
FIG. 52A is a top view showing a modification of the optical pickup device.

On the other hand, in the case of the arrangement shown in FIG. 52A, if semiconductor laser 1 is arranged such that line LN3 passing through emittance openings of laser chips 1a and 1b is parallel to the main surface of the optical disk, the laser beams would form beam spots asymmetrically on either side of the track. Thus, as shown in FIG. 52B, it is desirable to arrange semiconductor laser 1 such that line LN3 passing through the emittance openings of laser chips 1a and 1b is angled with respect to the main surface of the optical disk to form acute angle θ, which is equal to that shown in FIG. 52A.

Figure 52B:
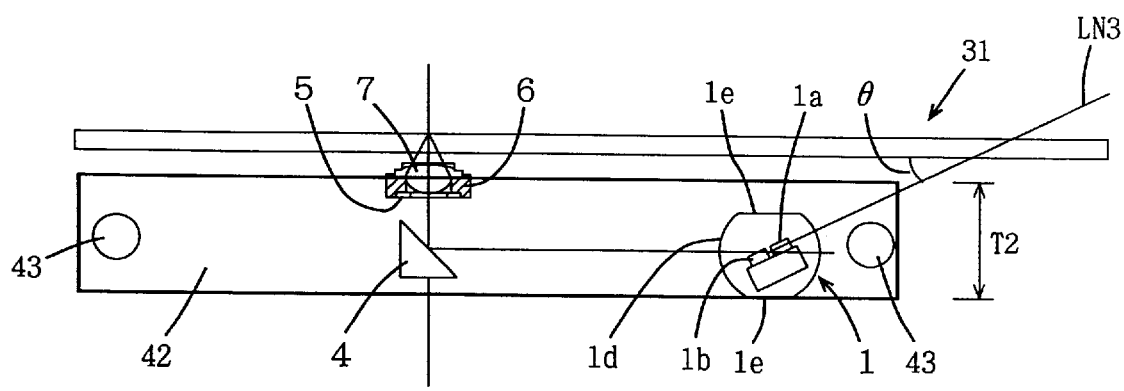
FIG. 52B is a cross sectional view showing the optical pickup device in FIG. 52A.

In addition, package 1d of semiconductor laser 1 shown in FIG. 52B is provided with a notch 1e which is parallel to the upper and lower surfaces of body 42. With such notch 1e formed in package 1d of semiconductor laser 1, a thickness T2 is obtained for body 42 which is smaller than a thickness T1 of body 42 shown in FIG. 51B.

While the above described optical pickup device is mainly directed for reproduction, it may also be directed for recording, or both recording and reproduction.

What is claimed is:

1. An optical pickup device performing recording and/or reproducing for a first optical disk having a first transparent substrate and a second optical disk having a second transparent substrate comprising;

an objective lens arranged opposite to said first or second optical disk;

a laser beam generating means for selectively generating one of a first laser beam with a first wavelength and a second laser beam with a second wavelength difference from said first wavelength; and an optical device arranged between said objective lens and said laser beam generating means and having a cental region allowing transmission of first laser beam without any diffraction and increasing a diameter of said second laser beam by diffraction, and having a peripheral region surrounding the central region and allowing transmission of said first laser beam without any diffraction and directing said second laser beam to the outside of said objective lens by diffraction, wherein said objective lens, said first and second laser beam, and said optical device are in a common central light axis, said central region of said optical device has a hologram formed thereon, and said peripheral region of said optical device has a diffraction grating formed thereon;

wherein said laser beam generating means is a semiconductor laser including a package, a first laser chip arranged within said package and generating said first laser beam, and a second laser chip arranged within said package and generating said second laser beam;

wherein said optical pickup device moves along two guide shafts provided in parallel in a radial direction of said first or second optical disk and further comprises:

a mirror arranged immediately below said objective lens and said optical device and reflecting said first or second laser beam directed from said semiconductor laser in a direction parallel to a main surface of said first or second optical disk in a direction perpendicular to said main surface of said first or second optical disk; and a body supported between said two guide shafts for containing said objective lens, said optical device, said semiconductor laser and said mirror, an optical axis of the laser beam directed to said mirror being angled with respect to a perpendicular passing through said two guide shafts to form an acute angle;

wherein said semiconductor laser further includes a photodetector arranged on a side opposite to an emittance side of said first and second laser chips for monitoring said first and second laser beams leaked from said first and second laser chips.

* * * * *